United States Patent
Hu et al.

(10) Patent No.: US 12,400,227 B2
(45) Date of Patent: Aug. 26, 2025

(54) INTEGRATION OF BLOCKCHAIN TRANSACTIONS WITH OFF-CHAIN PROCESSING

(71) Applicant: THE HONGKONG AND SHANGHAI BANKING CORPORATION LIMITED, Singapore (SG)

(72) Inventors: Steven Bin Hu, Singapore (SG); Frederick Lok Fai Kwan, Kowloon (HK); Ka Man Ng, Diamond Hill (HK); Wing-wai Lee, Tsuen Wan (HK); Craig Ramsay, Bedfordshire (GB); Lei Sun, Hong Kong (HK)

(73) Assignee: THE HONGKONG AND SHANGHAI BANKING CORPORATION LIMITED, Singapore (SG)

( * ) Notice: Subject to any disclaimer, the term of this patent is extended or adjusted under 35 U.S.C. 154(b) by 76 days.

(21) Appl. No.: 17/924,836

(22) PCT Filed: Mar. 18, 2021

(86) PCT No.: PCT/SG2021/050143
§ 371 (c)(1),
(2) Date: Nov. 11, 2022

(87) PCT Pub. No.: WO2021/230809
PCT Pub. Date: Nov. 18, 2021

(65) Prior Publication Data
US 2023/0214832 A1    Jul. 6, 2023

(30) Foreign Application Priority Data
May 13, 2020   (SG) .......................... 10202004407W

(51) Int. Cl.
*G06Q 20/40* (2012.01)
*G06Q 20/38* (2012.01)

(52) U.S. Cl.
CPC ......... *G06Q 20/401* (2013.01); *G06Q 20/389* (2013.01)

(58) Field of Classification Search
CPC ............................................. G06Q 20/00–425
See application file for complete search history.

(56) References Cited

U.S. PATENT DOCUMENTS 10,497,037 B2    12/2019   Isaacson et al.
2015/0332395 A1  11/2015   Walker et al.
(Continued)

FOREIGN PATENT DOCUMENTS

EP    3396608 A1   10/2018
EP    3496027 A1    6/2019

OTHER PUBLICATIONS

International Searching Authority (ISA/EP). International Search Report and Written Opinion. PCT Application No. PCT/SG2021/050143. Issued on Jun. 17, 2021. 12 pages.
(Continued)

*Primary Examiner* — Mohammad A. Nilforoush
(74) *Attorney, Agent, or Firm* — DENTONS Durham Jones Pinegar

(57) ABSTRACT

A system for performing a coordinated transaction is disclosed, involving a digital asset transaction performed on a blockchain and a payment transaction performed at a payment processing system. The system comprises a blockchain subsystem arranged to interface with the blockchain and to execute a main workflow process including the digital asset transaction and an interface to the payment processing system. A plurality of interface operations are provided which can be invoked by the main workflow process. Each
(Continued)

operation is arranged to communicate via the interface with the payment processing system to control execution of a respective stage of the payment processing transaction at the payment processing system; and to maintain on the blockchain minor transaction data tracking a status of the payment processing transaction at the respective stage. The system is further configured to synchronize execution of the digital asset transaction with the payment transaction using the interface operations.

14 Claims, 24 Drawing Sheets

(56) References Cited

U.S. PATENT DOCUMENTS

| | | |
|---|---|---|
| 2016/0260169 A1 | 9/2016 | Arnold et al. |
| 2016/0342976 A1 | 11/2016 | Davis |
| 2018/0075453 A1 | 3/2018 | Durvasula et al. |
| 2021/0073913 A1* | 3/2021 | Ingargiola ............... G06F 21/64 |

OTHER PUBLICATIONS

Entriken et al. "ERC-721: Non-fungible token standard", *Ethereum Improvement Proposals*, No. 721, Jan. 2018, 12 pages [https://eips.ethereum.org/EIPS/eip-721].

* cited by examiner

LOAD

UNLOAD

INTEGRATION OF BLOCKCHAIN TRANSACTIONS WITH OFF-CHAIN PROCESSING

CROSS-REFERENCE TO RELATED APPLICATION

This application is a national phase application under 35 U.S.C. § 371 of International Application No. PCT/SG2021/050143, filed Mar. 18, 2021, which claims priority to and the benefit of Singapore Application No. 10202004407W, filed May 15, 2020.

FIELD OF THE DISCLOSURE

The present invention relates to transaction processing in distributed computing systems, and in particular to systems that perform transactions involving both blockchain operations and operations at traditional centralised processing systems.

BACKGROUND

Blockchain systems are increasingly used for a variety of processing tasks. The distributed nature of blockchain systems differs fundamentally from the traditional client-server paradigm and each have distinct strengths and disadvantages. For example, whilst client-server architectures can often achieve high transaction throughput, the distributed nature and cryptographic features of blockchain systems can provide high levels of transaction integrity and verifiability. However, the fundamental differences in architecture make integration of both types of systems technically challenging. Coordinating data processing transactions involving both blockchains and conventional systems presents significant technical challenges, especially if there is a need to achieve high transaction throughput and transaction atomicity/integrity.

SUMMARY

Embodiments of the invention thus seek to address certain difficulties inherent in integrating blockchain systems with traditional systems architectures.

Accordingly, in a first aspect of the invention, there is provided a system for performing a coordinated transaction, the coordinated transaction including a digital asset transaction performed on a blockchain and a payment transaction performed at a payment processing system, the system comprising:
- a blockchain subsystem arranged to interface with the blockchain and to execute a main workflow process including the digital asset transaction;
- an interface to the payment processing system; and
- a plurality of interface operations adapted to be invokable by the main workflow process, wherein each operation is arranged to:
  - communicate via the interface with the payment processing system to control execution of a respective stage of the payment processing transaction at the payment processing system; and
  - maintain on the blockchain mirror transaction data tracking a status of the payment processing transaction at the respective stage;
- wherein the system is configured to synchronize execution of the digital asset transaction with the payment transaction using the interface operations.

By maintaining mirror transaction data tracking the status of the payment processing transaction on the blockchain, the payment transaction and digital asset transaction can be coordinated more effectively. The mirror transaction data can allow execution of the digital asset transaction to be linked and synchronized more precisely with the payment transaction.

The system may be configured to roll back the payment transaction based on the mirror transaction data in response to failure of a part of the coordinated transaction. Thus, by maintaining the mirror transaction data, the main workflow process can control the execution (and if necessary, rollback) of the coordinated transaction, even though it may not have direct moment-to-moment visibility of the progress of the payment transaction (which may be carried out by remote systems, e.g. banking/payment systems, which are not under the control of the main workflow process).

The system is preferably configured to perform the digital asset transaction and a given one of the interface operations as an atomic operation. The term "atomic operation" or similar as used herein preferably refers to a group of sub-operations that are performed in a coordinated fashion such that the atomic operation only completes successfully if the sub-operations all complete successfully. If any sub-operation fails, then the atomic operation is considered to fail (and is typically rolled back, e.g. by rolling back any completed sub-operations and/or partially completed/failed sub-operations, to place the system in the state it was in prior to the start of the atomic operation).

The interface operations may comprise a first operation to: communicate via the interface with the payment processing system to prepare the payment transaction by reserving a payment amount for the transaction from funds associated with a payment sender, and record mirror transaction data representing the reservation of funds. The first operation preferably comprises a load operation, the load operation configured to: allocate in the mirror transaction data a mirror value representative of the payment amount to a sender identity associated with the payment sender, and initiate a first payment operation at the payment processing system to transfer the payment amount from an account of the sender to an intermediate account entity, wherein the intermediate account entity preferably comprises a holding account maintained by a payment processing provider, optionally a logical subaccount of a holding account, where the holding account or logical subaccount may be associated with the sender.

The operations may comprise a second operation arranged to: communicate via the interface with the payment processing system to allocate the reserved payment amount from the payment sender to a payment receiver; and record mirror transaction data representing the allocation; wherein the workflow process is preferably configured to invoke the second operation in response to successful completion of the first operation. The second operation preferably comprises an update operation arranged to: transfer the mirror value from the sender identity to a further identity in the mirror transaction data, the further identity optionally comprising a receiver identity associated with the payment receiver or an intermediary identity. The intermediate account entity preferably comprises a first holding account for receiving an incoming payment and a second holding account for sending an outgoing payment, with the first payment operation configured to transfer the payment amount to the first holding account, the update operation configured when invoked to initiate a transfer of the payment amount from the first holding account to the second holding account. The first and second holding accounts are preferably associated with the sender and receiver respectively and/or or are logical subaccounts of a holding account maintained by a payment processing provider.

The operations may comprise a third operation arranged to: communicate via the interface with the payment processing system to initiate transfer of the allocated payment amount to the payment receiver; and record mirror transaction data representing the transfer; wherein the workflow process is preferably configured to invoke the third operation in response to successful completion of the second operation. The third operation may comprise an unload operation, wherein the unload operation is configured to: deallocate the mirror value from the receiver identity in the mirror transaction data, and initiate a payment operation at the payment processing system to transfer the payment amount from the intermediate account entity, optionally from a holding account or logical subaccount of a holding account associated with the payment receiver, to an account of the receiver.

Preferably, the workflow process is configured to perform the digital asset transfer and the second operation as an atomic operation, preferably whereby: the digital asset transfer and second operation are rolled back in response to failure of either the digital asset transfer or the second operation, and/or the third operation is performed only in response to successful completion of the digital asset transfer and the second operation. This can ensure that the digital asset only occurs when funds have been reserved (e.g. having been moved to a temporary location in the payment transaction), meaning that the transaction should not fail for lack of funds. Furthermore, completion of the atomic operation can in turn ensure that the funds have been assigned to the receiver (seller) when the digital asset has been transferred to the buyer, ensuring that both the payment and digital asset transaction can complete successfully.

Preferably, the workflow process is configured to: execute a call to the load operation to transfer payment funds from a sender account to an intermediate account entity associated with the sender and record mirror transaction data indicating allocation of a corresponding mirror value to a sender identity in the mirror transaction data for use in the transaction; following the load operation, execute one or more calls to the update operation to move payment funds from the intermediate account entity associated with the payment sender to an intermediate account entity associated with the payment receiver, optionally via one or more further intermediate account entities, wherein one or more of the update operations are preferably performed as an atomic transaction with the digital asset transfer, and to update mirror transaction data to track the movement of funds by transferring a mirror value allocation from the sender identity to the receiver identity, optionally via one or more intermediary identities, in the mirror transaction data; and in response to completion of the update operation(s) and the digital asset transaction, execute a call to the unload operation to transfer the payment funds from the intermediate account entity associated with the payment receiver to an account of the payment receiver and to update the mirror transaction data to indicate deallocation of the mirror value from the receiver identity.

Mirror values are preferably allocated to a sender identity from a global mirror value account identity on execution of the load operation and are deallocated from a sender identity to the global mirror value account identity on execution of the unload operation.

The load, update and unload operations preferably update mirror values associated with identities on the blockchain by adding update records to the mirror transaction data indicating mirror value changes, preferably increases or decreases of mirror value, associated with particular mirror value identities. Updating of mirror transaction data to allocate, move or deallocate mirror value preferably comprises deducting the mirror value from a first identity and adding the mirror value to a second identity, preferably by associating a negative mirror value update record (e.g. as a mirror value token) with the first identity and associating a positive mirror value update record (e.g. as a mirror value token) with the second identity.

The system preferably further comprises a consolidation operation configured to compute for a given identity in the mirror transaction data, a starting balance for a second transaction period based on a current starting balance entry associated with the given identity for a first, preceding, transaction period and a set of mirror value update records associated with the given identity created during the first transaction period, and optionally to delete or invalidate the starting balance entry and/or mirror value update records associated with the first transaction period. The system is preferably configured to perform the consolidation operation for one or more identities periodically, optionally daily.

Preferably, one or more or each of the interface operations, the consolidation operation, and the workflow process comprise code routines, optionally smart contracts, stored and/or configured to execute on the blockchain (e.g. executing at blockchain nodes).

The system may comprise further operations in the form of code routines, optionally one or more smart contracts, adapted to run on the blockchain, to perform the updates to the mirror transaction data, the further operations preferably invoked by the first, second and/or third operations.

Preferably, each of the first, second and third interface operations are associated with and configured to invoke a respective operation at the payment processing system, the operations at the payment processing system for performing respective stages of the payment transaction. The operations at the payment processing system are preferably implemented as a set of services running at the payment processing system that are invoked via an application programming interface (API) of the payment processing system.

The blockchain subsystem, interface and interface operations are preferably implemented on one or more processing nodes operating as one or more nodes of the blockchain, the processing node(s) preferably connected to the payment processing system via a network.

In a further aspect of the invention, which may be combined with the above aspect, there is provided a method of synchronizing a blockchain transaction with a payment transaction at a payment processing system, wherein the payment transaction is for transfer of a payment amount from a sender to a receiver, the method comprising:
executing synchronized operations at the payment processing system and the blockchain to perform:
the payment transaction at the payment processing system, and
a mirror transaction on the blockchain mirroring a flow of value corresponding to the payment transaction; and
controlling execution of the blockchain transaction in dependence on the execution of the synchronized operations.

Executing synchronized operations preferably comprises: executing a load operation, wherein the load operation comprises: a blockchain operation to allocate a mirror value representative of the payment amount to a sender identity associated with the sender on the blockchain, and a first payment operation at the payment processing system to transfer the payment amount from an account of the sender to an intermediate account entity.

Preferably, executing synchronized operations comprises: executing one or more update operations, wherein the one or more update operations transfer the mirror value from the sender identity to a receiver identity associated with the receiver on the blockchain, optionally via one or more intermediary entities. The intermediate account entity preferably comprises a first holding account for receiving an incoming payment and a second holding account for sending an outgoing payment, with the first payment operation transferring the payment amount to the first holding account, the one or more update operations further comprising initiating a transfer of the payment amount from the first holding account to the second holding account. The first and second holding accounts are preferably associated with the sender and receiver respectively and/or or are logical subaccounts of a holding account maintained by a payment processing provider.

Executing synchronized operations may further comprise: executing an unload operation, wherein the unload operation comprises: a blockchain operation to deallocate the mirror value from the receiver identity on the blockchain, and a second payment operation at the payment processing system to transfer the payment amount from the intermediate account entity, optionally the second holding account, to an account of the receiver.

The method may comprise aborting the blockchain transaction in response to failure of any of the load, update and unload operations, and optionally rolling back one or more of: the blockchain transaction, the mirror transaction, and the payment transaction.

Preferably, controlling execution of the blockchain transaction comprises performing the blockchain transaction and one or more update operations as an atomic operation, preferably such that the synchronized operations are rolled back in response to failure of either one of the blockchain transaction and the update operation(s) and/or such that the unload operation is performed in dependence on successful execution of both the blockchain transaction and the one or more update operation(s).

The blockchain transaction preferably comprises a transaction for exchange of a digital asset, optionally comprising transfer of the digital asset from the receiver to the sender, wherein transfer of ownership of the digital asset is preferably recorded on the blockchain.

The mirror transaction preferably comprises transfer of mirror values providing representations of value between identities on the blockchain, the identities preferably including one or more of: the sender identity, the receiver identity, and a global mirror value account identity, the transfer of mirror values optionally performed by the load, update and unload operations.

Allocating a mirror value to the sender identity may comprise transferring the mirror value from the global mirror value account identity on the blockchain to the sender identity. Alternatively or additionally, deallocating the transaction value from the receiver identity may comprise transferring the transaction value from the receiver identity to the global mirror value account identity.

Transferring a mirror value from a given first identity to a given second identity may comprise creating a debit value token and a credit value token corresponding to the mirror value, and associating the debit value token with the given first identity and the credit value token with the given second identity. The method may comprise, for each of a plurality of entities, optionally comprising the sender identity, receiver identity, and global mirror value account identity, maintaining on the blockchain: a starting balance associated with the entity; one or more debit tokens each indicating a mirror value deduction from the entity; one or more credit tokens indicating a mirror value addition to the entity.

The method may comprise: accumulating debit and/or credit tokens associated with one or more entities during a transaction period; at the end of the transaction period, computing a new starting balance based on the starting balance associated with the entity and the accumulated debit and/or credit tokens associated with the entity; and associating the new starting balance with the entity for use in a subsequent transaction period.

Preferably, the method comprises verifying data on the blockchain by determining whether a sum of mirror values associated with sender, receiver, and global account identity at the end a payment transaction correspond to the corresponding sum prior to the transaction or optionally whether the sum equals zero at the end of the transaction, and aborting and/or rolling back the blockchain transaction, mirror value transaction and/or payment transaction in the event of a negative determination.

The method may be performed by a set of code routines, preferably smart contracts, running on the blockchain and configured to interface with the payment processing system to invoke operations of the payment processing system.

In a further aspect of the invention, which may be combined with any of the above aspects, there is provided a method of tracking transactions for transfer of financial value using tracking data stored on a blockchain, the method comprising: storing on the blockchain, for each of a plurality of entities, a starting balance associated with the entity for a transaction period; during the transaction period, accumulating on the blockchain transaction tokens associated with the entities, wherein each transaction token specifies a change amount for a change in a balance of a given one of the entities; at the end of the transaction period, computing new starting balances for one or more of the entities based on the starting balance associated with each entity for the transaction period and one or more accumulated transaction tokens associated with each entity; and associating the new starting balances with the entities for use in a subsequent transaction period.

The computing and associating steps may be repeated periodically, e.g. daily, and are preferably performed for each entity for which there are one or more accumulated transaction tokens. The entities may comprise user identities and/or virtual account identities, with transaction tokens and starting balances associated with respective user/account identities.

The change amount specifies the amount by which a balance is changed by a transaction, i.e. a difference value, corresponding to the transaction value. The transaction tokens preferably comprise: a set of debit transaction tokens, each indicating a value deduction from a balance of a given entity (e.g. as a negative change value); and a set of credit transaction tokens, each indicating a value addition to a balance of a given entity (e.g. as a positive change value).

The method preferably comprises processing an operation or transaction to transfer value from a first entity to a second entity, the processing comprising: associating a debit transaction token specifying the deduction of the transferred value with the first entity; and associating a credit transaction token specifying the addition of the transferred value with the second entity.

The tracking data preferably mirrors a payment transaction performed in a payment processing system external to the blockchain, the method comprising synchronizing execution of a mirror transaction to transfer value between entities in the blockchain with the payment transaction performed at the payment processing system. The method may further comprise synchronizing the execution of the mirror transaction and the payment transaction with a blockchain transaction for transfer of a digital asset, wherein ownership of the digital asset is preferably specified by data stored on the blockchain, the method comprising recording data on the blockchain to specify a change in ownership of the digital asset.

The digital asset transaction and the payment processing transaction may be performed in a coordinated transaction in which a payment operation to allocate a payment amount sourced from a payer entity to a payee entity and the transfer of ownership of the digital asset are performed as an atomic operation, the atomic operation preferably further comprising a corresponding operation of the mirror transaction (e.g. to transfer mirror value between sender and receiver identities associated with the payer entity and payee entity respectively).

The mirror transaction may comprise a plurality of stages for transfer of values between entities on the blockchain, wherein one or more of the stages are associated and/or synchronized with respective payment operations in the payment processing system to effect transfer of payment from a payer to a payee.

Multiple coordinated transactions associated with a given entity may be processed in parallel. Preferably, the method comprises processing first and second coordinated transactions involving a given payer or payee entity, the second coordinated transaction initiated after the first coordinated transaction, each coordinated transaction including one or more transfers of value on the blockchain mirroring a payment processing transaction in an external payment processing system (and preferably also including a digital asset transfer as set out above), wherein at least one transfer of value for the second coordinated transaction is executed before the first coordinated transaction has been completed.

Transaction tokens are preferably submitted for addition to the blockchain and are added to the blockchain using a block submission mechanism of the blockchain. The block submission mechanism preferably comprises a consensus algorithm (e.g. proof of work or proof of stake). The method may comprise submitting one or more transaction tokens associated with a given entity for addition to the blockchain before processing of one or more previously submitted transaction tokens associated with the same entity using the block submission mechanism has been completed. The above features may enable increased transaction throughput and may reduce processing delays.

The method may comprise accumulating transaction tokens in temporary storage prior to submission to the blockchain, wherein accumulated transaction tokens are written to the blockchain in batches. New transaction tokens for an entity may be accumulated in this way before earlier tokens for the entity have been written to the blockchain.

A coordinated transaction may comprise a transfer of mirror value from a sender identity associated with a payer to a receiver identity associated with a payee, optionally via one or more intermediate entities, for example using the methods as set out above (this may include creating respective debit and credit tokens specifying the transfer between sender and receiver or specifying individual transfer stages where intermediate entities are involved).

The entities may include a global mirror value account identity, wherein processing a transaction comprises: transferring the transaction value from the global mirror value account identity to a sender entity at the start of the coordinated transaction by creating respective debit and credit transaction tokens associated with the respective entities, and transferring the transaction value from a receiver identity back to the global mirror value account identity at the end of the coordinated transaction by creating respective debit and credit transaction tokens associated with the respective entities.

In a further aspect, the invention provides a system as set out in the first aspect, configured to perform or participate in a method as set out in any of the above method aspects. More generally, any of the features of the above methods may be incorporated into the system aspect and vice versa.

The invention also provides a system, processing device or apparatus, having means, optionally in the form of one or more processors with associated memory, for performing any method as set out herein, and a computer program, computer program product or non-transitory computer readable medium comprising software code adapted, when executed on a data processing system, to perform any method as set out herein. The computer program or computer program product may be in the form of stored code or code transmitted over, or made available for transmission over, a network such as the Internet.

BRIEF DESCRIPTION OF THE DRAWINGS

Preferred features of the present invention will now be described, purely by way of example, with reference to the accompanying drawings, in which.

DETAIL DESCRIPTION OF THE INVENTION

Figure 1:
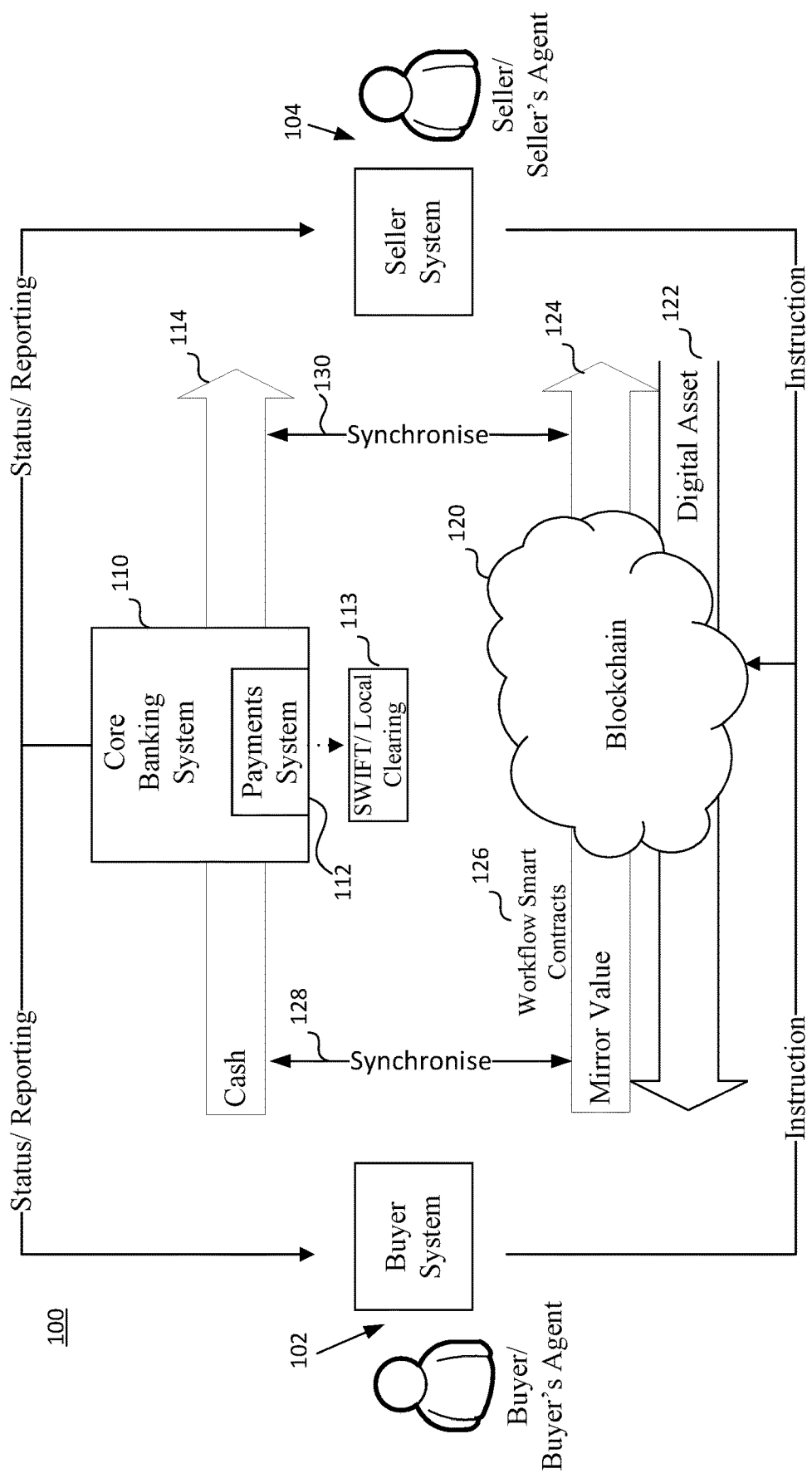
FIG. 1 illustrates a transaction processing system in overview.

Embodiments of the invention provide a blockchain integration architecture that includes a blockchain interface (e.g.

implemented as smart contracts) which can interface with conventional client-server processing systems to coordinate processing of data transactions across the two distinct architectural domains.

One example where the described integration architecture can be useful is in coordinating blockchain digital asset transactions with off-chain financial transactions.

Blockchain systems are increasingly used for a variety of transactions and can be particularly suited to transactions involving digital assets. While blockchain-based crypto-currencies are available, they are typically only used in limited domains, facing challenges in adoption as a payment instrument.

Blockchain-based crypto-currencies are typically unable to match the transaction throughput performance of traditional centralised computing systems. It often takes a significant amount of time to process a crypto-currency transaction with limited throughput and bandwidth performance, largely due to the consensus algorithm execution and the communication overhead required to perform the conflicting transaction management. In either account-based or token-based designs, payments with the same account cannot proceed concurrently, since every transaction requires the previous balance or token output as the transaction input. As a result, the payment receivers often have to wait for a long time for the transaction to reach settlement finality (which are often probabilistically based) or rely on the good faith of the senders. In the latter case, the receivers are subject to the risks arising from the inability to use existing risk or fraud management methods. The throughput and bandwidth issue also limits the development of high-frequency use cases, such as instant micro-payments. Hence, crypto-currencies have often been considered unsuitable as a payment settlement instrument.

In addition, crypto-currencies are often tagged to addresses associated with owners, e.g. in an e-wallet. The e-wallet, despite being software or hardware-based, can be lost or stolen. The monies cannot be recovered by the rightful owner, resulting in significant energy waste. It is typically difficult to prove the owner's identity in the case of a dispute.

Another problem is that crypto-based payment schemes are outside the traditional banking infrastructure and not cleared by traditional ACH (Automated Clearing House) systems, and have thus attracted scrutiny in relation to statutory oversight, information security, and the risks of being used in money laundering and terrorism-financing activities.

As such, there is often a need to support digital asset transactions using "real" currency payments. However, given the fundamentally different technical architectures of traditional financial payment systems on the one hand, and blockchain-based digital eco-systems on the other hand, coordinating transactions involving both types of system presents a variety of technical hurdles. For example, traditional centralised computing systems typically achieve high transaction throughput performance, which blockchain systems are unable to match as explained above. The requirement for transaction atomicity and integrity is also difficult to achieve across two such disparate systems.

Although central banks have started experimenting with state-backed crypto-currency, a.k.a., central bank digital currency (CBDC), and CBDC has the potential to address some of the issued in private-issued crypto-currencies, there has been no clear timeline for launching a major currency-denominated CBDC. Amongst a variety of challenges, fundamentally, the global development of CBDCs is facing difficulty in operating models, technology development, regulatory, legal certainty, oversight and public policy considerations. For example, there is no consensus whether CBDC should be account- or token-based and whether interest bearing features should be included such as in other electronic monies, let alone the clarity required for tax treatment and other legislative work required.

As a result, there are presently no solutions enabling banking systems to incorporate the processing of payments arising from transactions on a blockchain in a regulated, safe and convenient technological framework.

Embodiments of the invention provide a set of technology components connecting the on-chain ledger to off-chain bank applications and core banking systems which may ultimately interface with the wider financial infrastructure. Specifically, the methods and systems include the following main components:

A private database of mirror transaction data stored on the blockchain, recording transaction data that mirrors a real-world financial transaction A message orchestration layer to synch up the on-chain ledger and the off-chain bank ledger in real-time, routing messages to a payment processing system to control execution of the real-world payment transaction and allow the real-world payment transaction to be synchronised with a blockchain transaction, such as a digital asset transaction The systems and methods can be applied to a variety of transaction scenarios, both domestically and internationally, involving the atomic payment settlement for the delivery of assets on blockchain-based digital eco-systems. A variety of transaction flows can be implemented, such as:

Direct Buyer to Seller
Buyer→Buyer Agent→Seller Agent→Seller
Buyer→Buyer Agent→Seller
Buyer→Seller Agent→Seller Note that, in terms of payment flow, the buyer for a transaction corresponds to the payment sender and the seller for a transaction corresponds to the payment receiver.

The systems can enable a form of atomic delivery vs. payment across the disparate technical architectures of a conventional centralised processing architecture for financial transactions and a blockchain-based digital ecosystem for transfer of digital assets. The term "atomic delivery vs. payment" refers to the fact that the two parts of a transaction (e.g. conventional payment and digital asset delivery via a blockchain) are arranged to be atomic, such that either both succeed as part of an overarching coordinated transaction, or both fail.

FIG. 1 illustrates an example embodiment in overview. A data processing system 100 includes two subsystems, each implemented using distinct and conventionally incompatible architectural paradigms. A core banking system 110 is constructed using a traditional centralized processing architecture (e.g. a client-server based architecture) and provides system functions supporting financial transactions, including a payments system 112. The system supports a real money transaction 114 between a buyer or buyer agent and a seller or seller agent. Buyer (agent) and seller (agent) interact with the system via respective buyer/seller systems 102, 104 which may, for example, be client computers, or server computers interacting with client devices to implement the buyer and seller parts of the transaction.

A blockchain system 120 implements blockchain-based data processing. In this example, the blockchain provides digital asset transactions, including a digital asset transaction 122 for transferring a digital asset from the seller to the buyer. For example, this could be a corporate bond issued by an issuer as a digital asset and sent to an investor. The digital asset transaction could also involve a digital contract exchange on the blockchain for transfer of a non-digital asset, e.g. a real estate purchase or art purchase with the contract signed digitally on the blockchain. More generally, the digital asset transaction could include any transaction for an asset where asset ownership and ownership transfer is recorded on the blockchain. For example, real-world assets could be represented by tokens ("tokenized asset") which can be traded on the blockchain.

In the depicted example, cash transaction 114 and digital asset transaction 122 are components of an overall coordinated transaction, for example involving purchase of a digital asset for real-world currency, where the transfer of the asset (from user/system 104 to user/system 102) occurs via the blockchain system 120 and the payment transaction (from user/system 102 to user/system 104) occurs via the core banking system 110.

In order to enable integration of the two parts of the transaction into a single coordinated atomic transaction, embodiments of the invention provide for synchronization interactions 128, 130 between transaction 114 and transaction 122 via a mirror value transaction 124 implemented on the blockchain 120. The blockchain digital asset transaction 122, mirror value transaction 124 and synchronization functions 128, 130 are implemented using a set of workflow smart contracts 126.

FIG. 1 also shows control and status data flows with instructions provided by buyer system 102 and seller system 104, and status information flowing from banking system 110 back to systems 102, 104.

Figure 2:
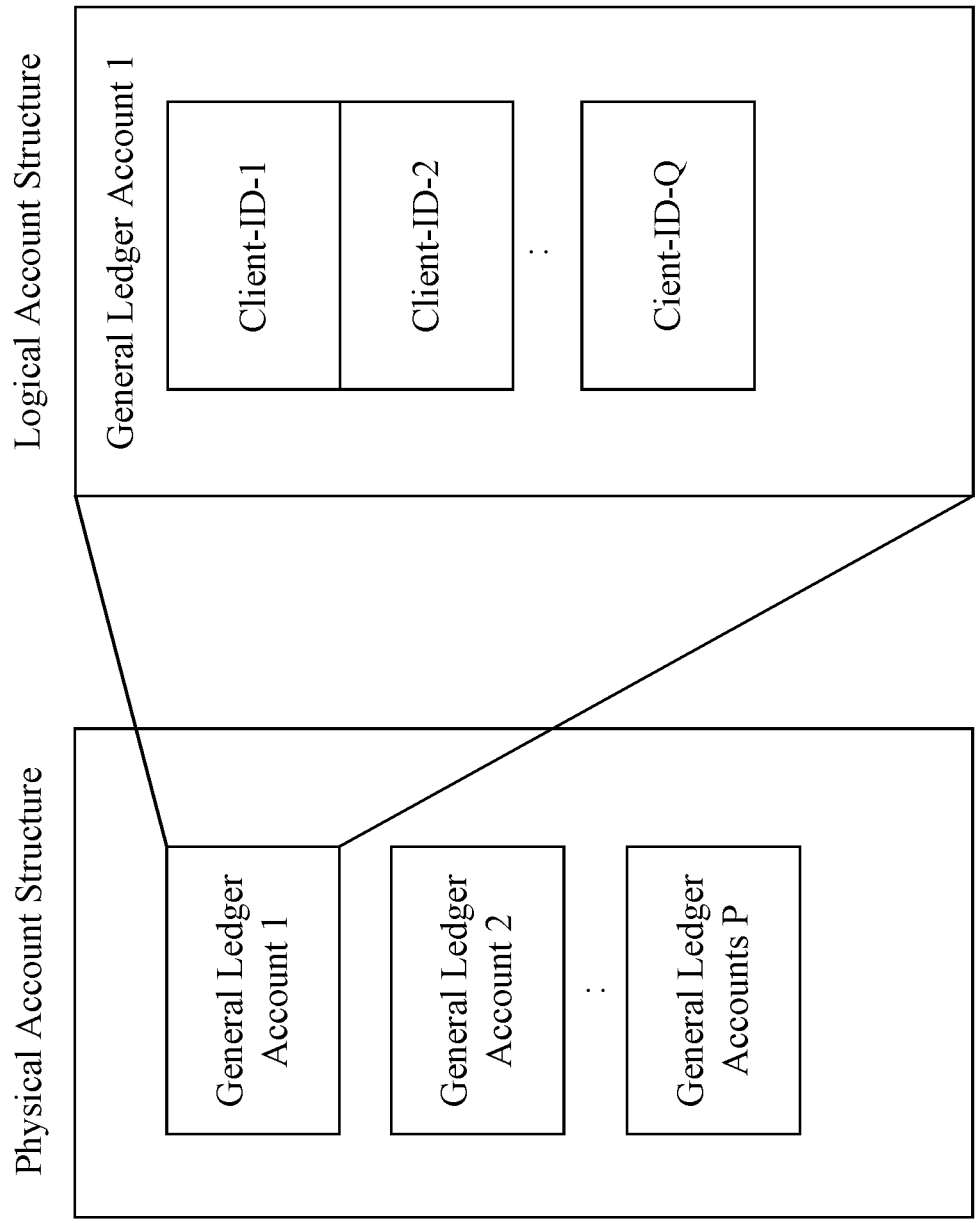
FIG. 2 illustrates accounts and logical subaccounts used to support transactions.
Figure 3:
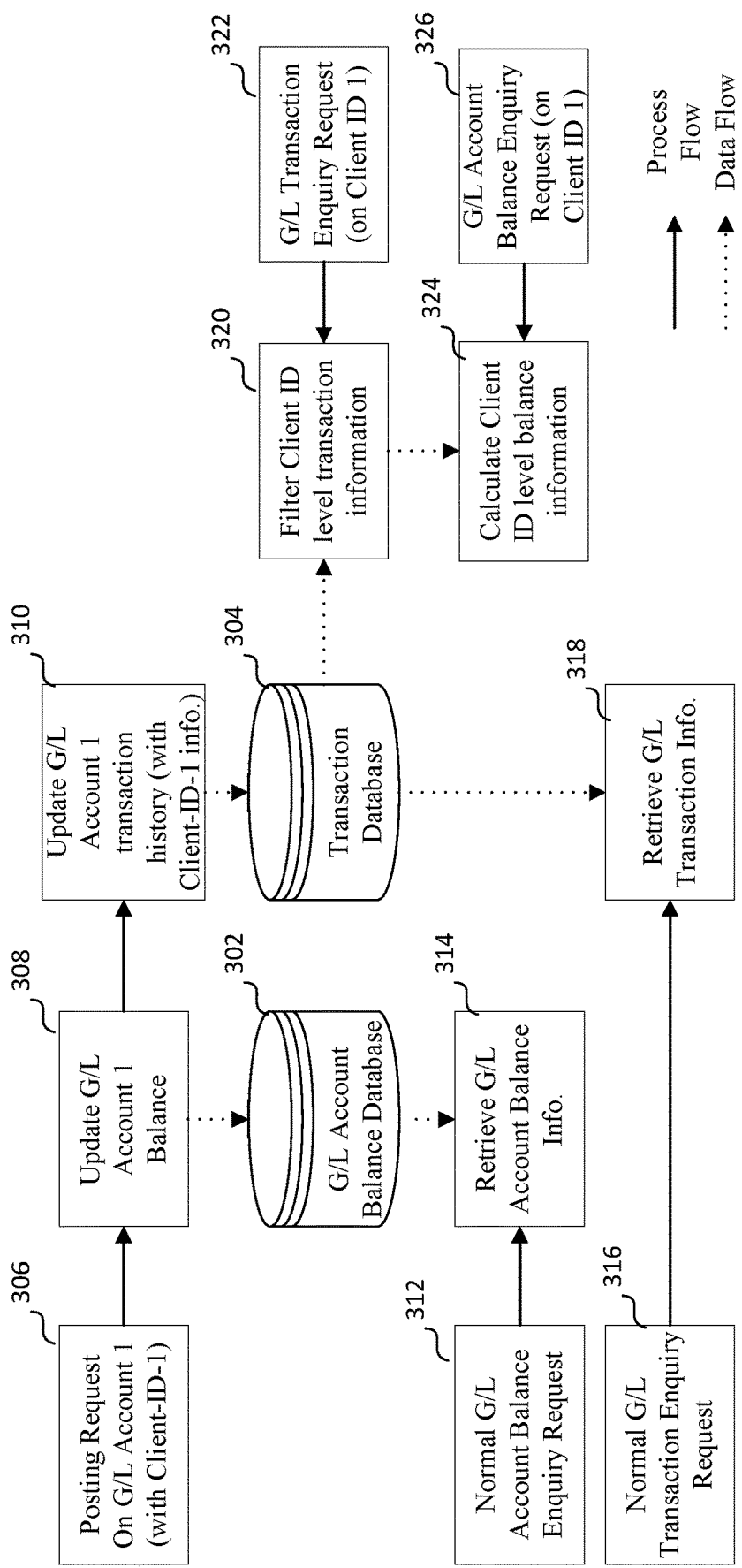
FIG. 3 illustrates processes for performing transactions.

Aspects of the core banking transaction are illustrated in FIGS. 2-3. FIG. 2 illustrates physical account structures and associated logical account structures used to process the real money transaction 114. The transaction uses a holding account, e.g. general Ledger Account 1, which is a "physical" account. Physical accounts represent conventional accounts, with each physical account potentially holding data and transactions for multiple logical accounts associated with different clients, each logical account associated with a client identifier. Here, General Ledger (GL) Account 1 contains logical sub-accounts for clients with identifiers Client-ID-1 through Client-ID-Q. The logical accounts are used as holding accounts for temporarily holding funds during a transaction as described in more detail below. They allow tracking of the buyer and seller for payment transparency. In particular, the client IDs identify sub-accounts which maintain an audit trail of transactions, and can also be used to ensure that only authorised users can use this service.

FIG. 3 illustrates account transactions utilizing the above account structure in the core banking system. Account balances and transactions for physical accounts are stored using a general ledger account balance database 302 and a transaction database 304. A typical transaction may involve a request 306 to post a transaction for a given GL account (here "Account 1") for a given client (here "Client-ID 1"). In response, the general ledger account balance for Account 1 is updated (step 308) in GL Account Balance Database 302. The transaction database 304 is also updated in step 310 with the transaction details (again for the identified account and client).

Account-level enquiries are shown in steps 312-318. Processing of a regular account balance enquiry is depicted in step 312 (receipt of balance enquiry request) and step 314 (retrieval of account balance for the account from the account balance database 302). Similarly, a transaction enquiry 316 is processed by retrieving GL transaction information from transaction database 304 in step 318.

Client-specific enquiries (relating to logical accounts) are shown in steps 320-326. On receipt (step 322) of a transaction enquiry request specific to a client ID (here "Client ID 1") transaction data is read from transaction database 304 and filtered by client ID (step 320). For a balance enquiry specific to a client ID (here "Client ID 1"), transaction data is again read from transaction database 304 and filtered by client ID (step 320), and then balance information specific to the client ID is computed in step 324. The balance information is computed by summing the transaction values for the transactions for that client ID.

Figure 4:
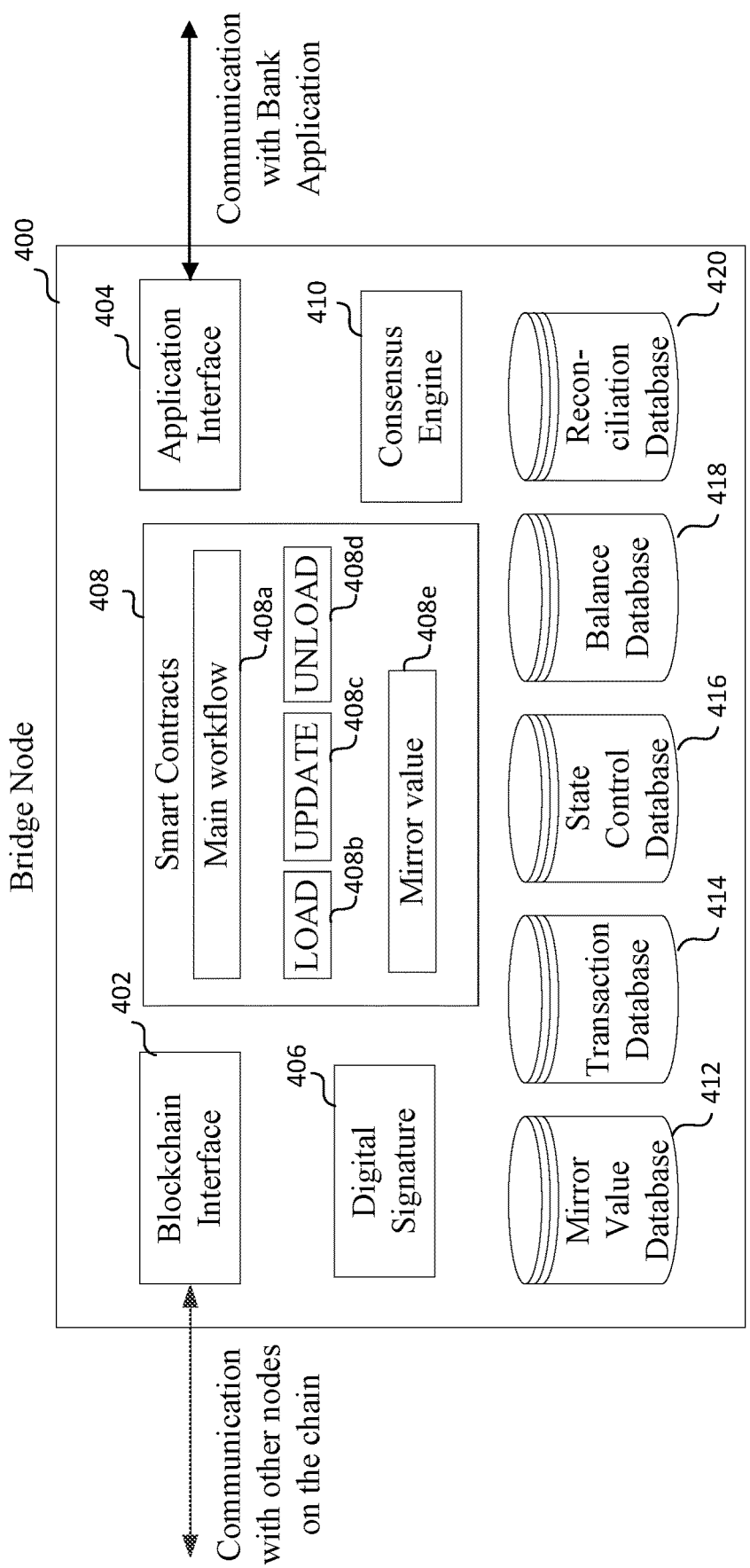
FIG. 4 illustrates a bridge node for interfacing between a payment system and a blockchain.

FIG. 4 illustrates an integration node for supporting integration between blockchain and core banking systems, referred to herein as a bridge node. This may, for example be implemented as part of core banking system 110 (FIG. 1), or as a separate component connected to the core banking system. The bridge node 400 functions as a node on the blockchain 120 (FIG. 1) and as such includes a blockchain interface 402 for communicating with other nodes on the blockchain. The node further includes software implementing middleware between the bridge node and banking system. This includes an application interface 404 for communicating with components and applications of the core banking system 110. The bridge node 400 implements a digital signature module 406 for signing transactions, a smart contract module for executing smart contracts 408 on the blockchain, and a blockchain consensus engine 410 for processing transactions to the blockchain in accordance with the required consensus mechanism implemented on the blockchain (e.g. proof-of-work, proof-of-stake etc.)

The bridge node 400 may further include transaction database 414 and balance database 418 for keeping local copies of transaction and balance data to improve performance. Additionally, a mirror value database can be provided for maintaining a local a copy of mirror value entries recorded on the blockchain to improve performance (e.g., querying speed). A state control database 416 and reconciliation database 420 used to store all history and results of reconciliation can also be provided.

The smart contracts 408 are code routines that are stored on the blockchain and can be executed by a blockchain node to read, process and update data stored on the blockchain. They include a set of main workflow smart contracts 408a for controlling the blockchain transaction, e.g. the digital asset transaction, including any preparatory steps such as checking authorisation of transaction parties and ownership of an asset.

The smart contracts 408 also include a set of interface operations for coordinating a mirror value transaction on the blockchain with the real-world payment transaction. The operations include a load operation 408b, an update operation 408c and an unload operation 408d. These operations interface with corresponding services at the payment processing system (112) to control the different stages of the payment transaction at the payment processing system, whilst tracking the payment transaction in its different stages via the mirror value transaction. These operations will be described in more detail below. The mirror value transaction may use a set of mirror value smart contracts 408e to record and update mirror transaction data on the blockchain.

Note that, while shown as a single node, the functions of the bridge node may be embodied in a single processing device (e.g. computing server) or may be distributed across multiple processing devices. The databases 412-420 represent different data sets conceptually, but in practice some or all of these could be combined into one or more physical databases in various ways depending on requirements. Some or all of these databases may be omitted (e.g. if a local copy of mirror value data is not needed in addition to the data held on the blockchain).

Figure 5:
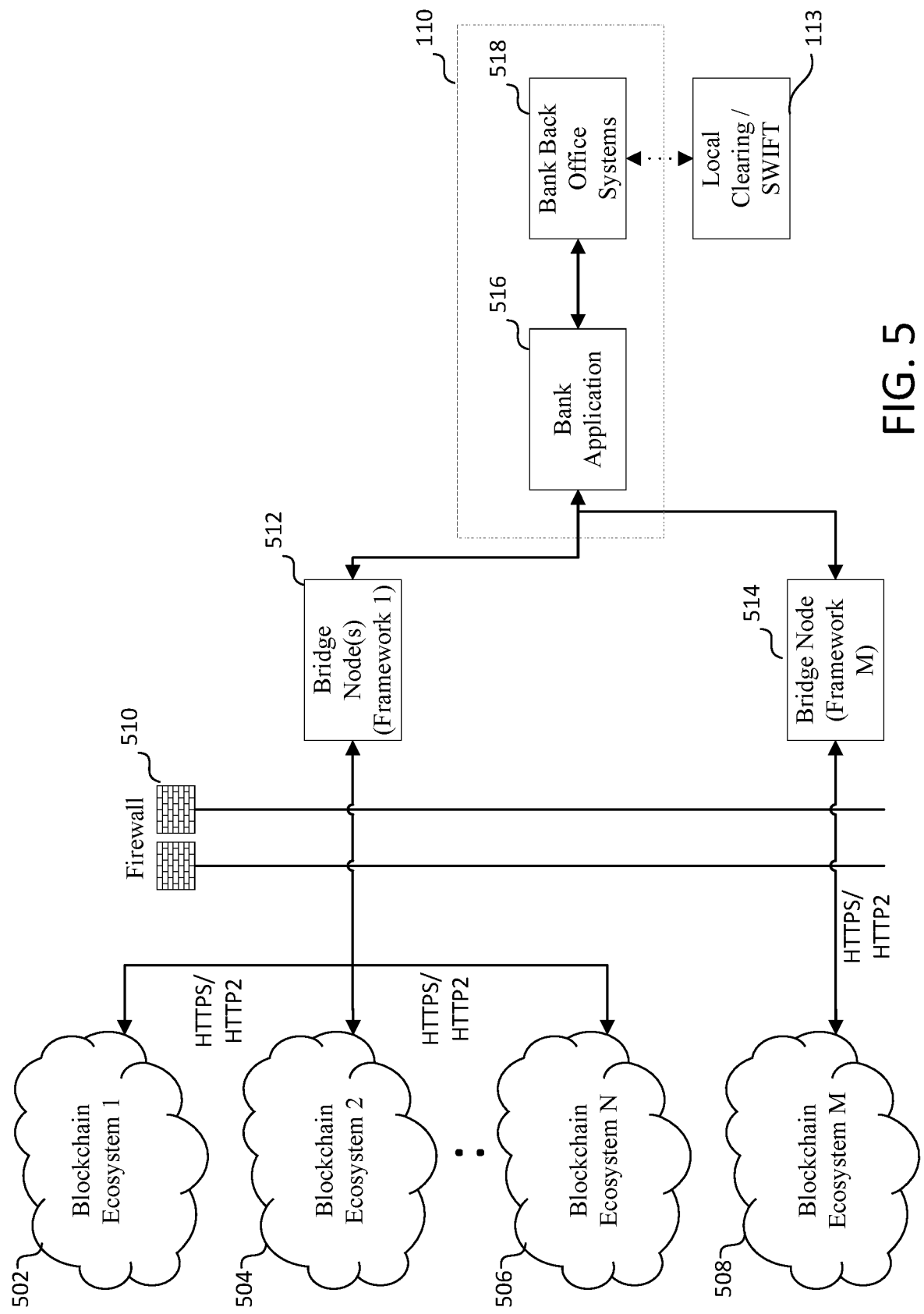
FIG. 5 illustrates integration between bank systems and multiple blockchain systems.

FIG. 5 illustrates use of the integration framework for integrating multiple blockchain systems with a traditional centralized banking system 110. Here, blockchain systems 502-508 interface with the centralized banking system 110 via multiple bridge nodes 512, 514 (these may each correspond to the node 400 depicted in FIG. 4). As illustrated, a given bridge node may interface with a single blockchain system (see node 514 serving blockchain system 508) or with multiple blockchain systems (see node 512 servicing blockchain systems 502, 504, 506).

For example, a bridge node may support multiple blockchains utilizing the same blockchain technology framework, with distinct nodes provided for distinct blockchain frameworks. The blockchain systems 502-508 are typically distributed, public systems, whereas bridge nodes 512, 514 and centralized banking system 110 are private systems located e.g. on a private network of the bank, and may be protected via one or more firewalls 510. Each bridge node 512, 514 interfaces with its respective blockchain systems one the one hand, and with a banking application 516 within the centralized banking system 110 to carry out transactions. The bank application 516 in turn interfaces with bank back office systems 518 as needed to complete the required processing. Conventional payment transactions are carried out by the bank system 110 using payment processing system, e.g. local clearing house/SWIFT payment systems 113.

Figure 6:
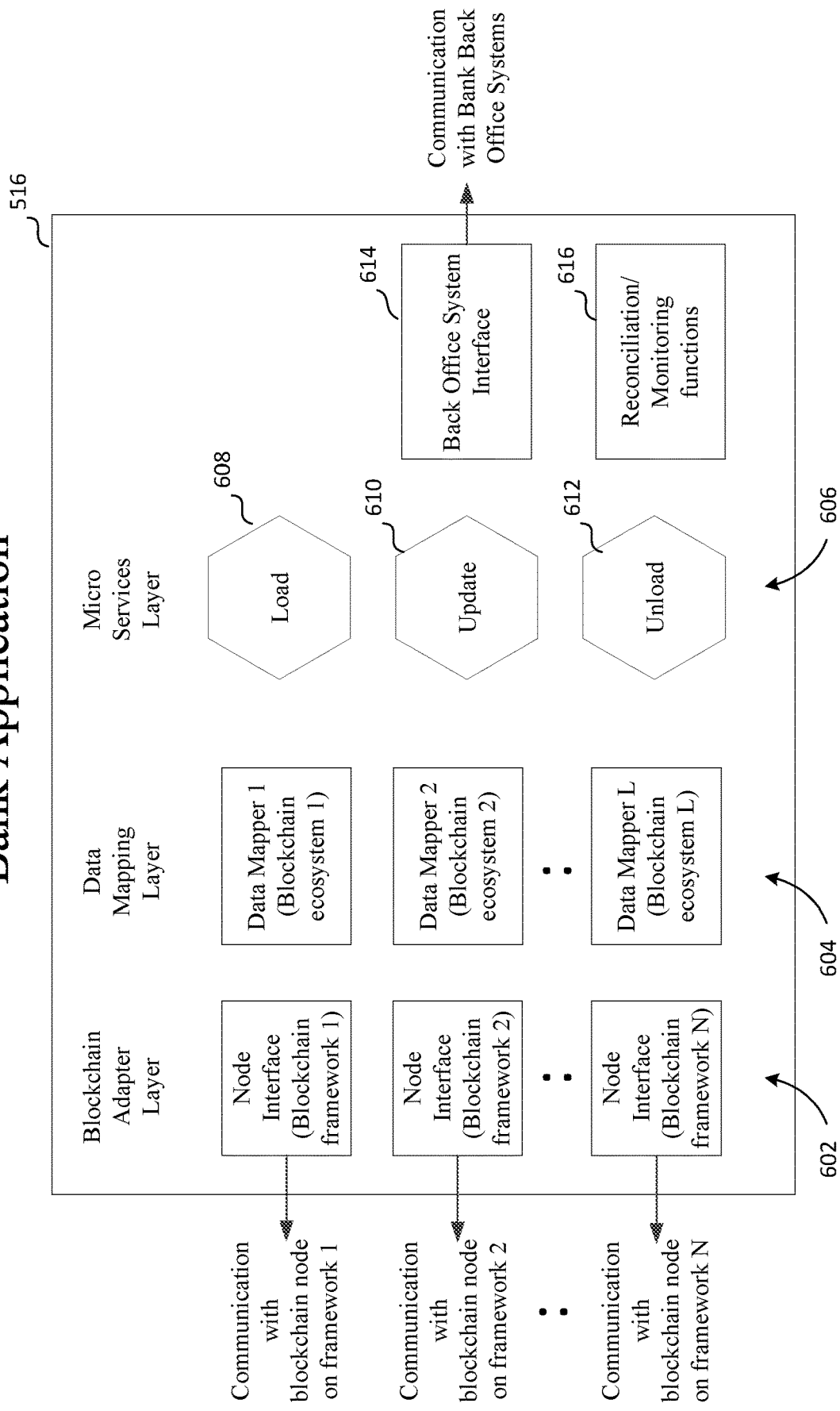
FIG. 6 illustrates processing modules of a bank application.

FIG. 6 illustrates the architecture of the banking application 516 of FIG. 5. The application includes a blockchain adapter layer 602, data mapping layer 604 and microservices layer 606.

The blockchain adapter layer 602 provides node interfaces for communicating with bridge nodes (e.g. nodes 512, 514 of FIG. 5) of respective blockchain frameworks (as noted above a given node may support multiple blockchains or a single blockchain). The data mapping layer implements a data mapping between data representations used by the blockchains/bridge nodes, and data representations used by banking systems, by performing any necessary translations, conversions, reformatting etc. of data flowing to or from a blockchain. Again, a distinct mapper module may be provided for each blockchain framework/bridge node. The specific arrangement may depend on the data mapping requirements.

The microservices layer 606 includes a set of processing components for coordinating payment processing in the banking system with mirror value transactions performed on the blockchain. These include a load service 608, an update service 610, and an unload service 612. These services interact with corresponding mirror value operations on the blockchain (in particular, load operation 408b, update operation 408c and unload operation 408d of FIG. 4, respectively) as is described in more detail later. The bank application further includes a back office system interface 614 for communication with back office systems 518 (FIG. 5), and other ancillary functions such as reconciliation and monitoring functions 616.

Figure 7:
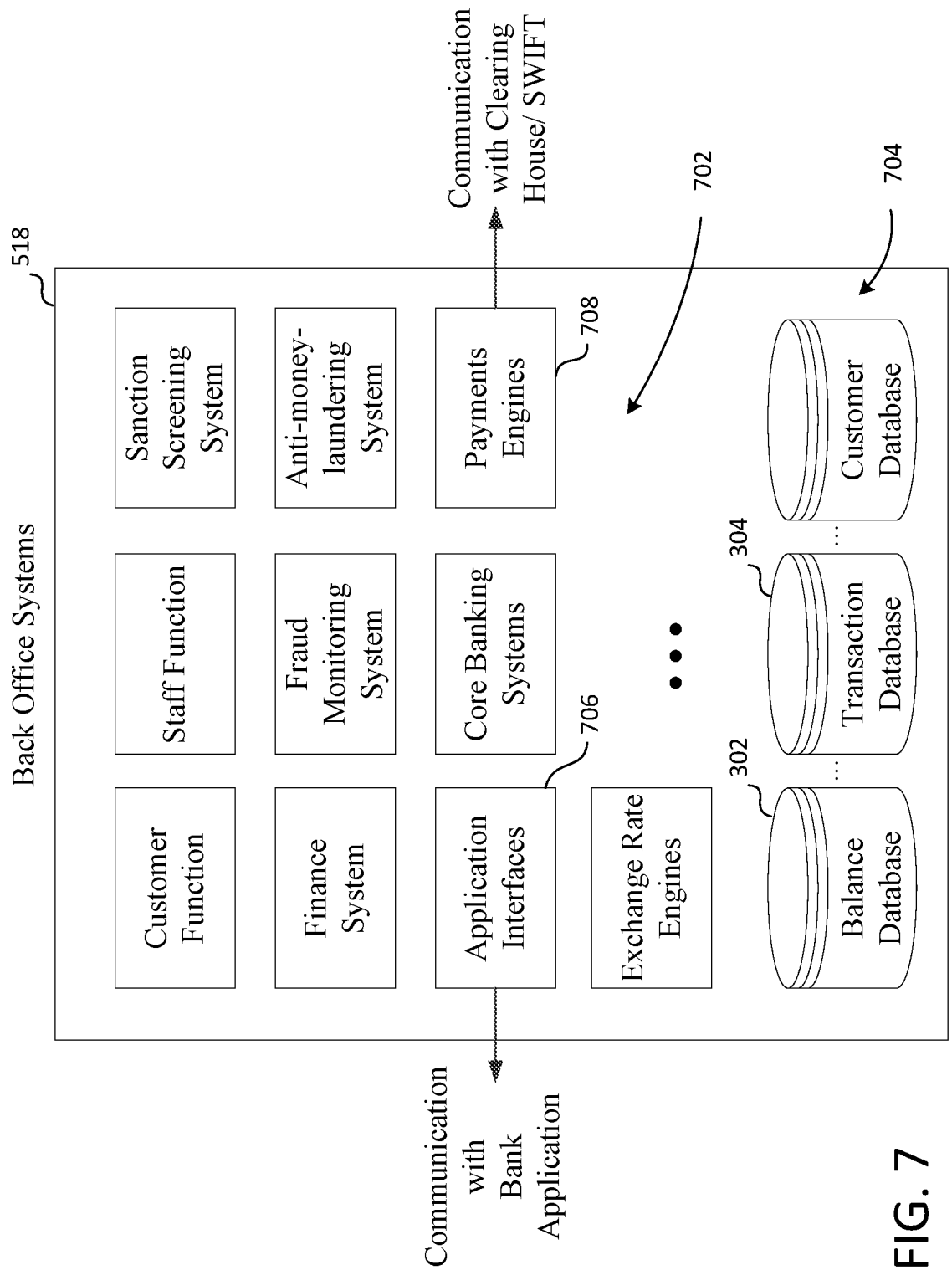
FIG. 7 illustrates back office system modules.

FIG. 7 further illustrates back office systems 518. The back office systems include a range of processing functions 702 and databases 704 associated with conducting banking transactions and other core banking functions. The back-office systems also include interfaces 706, 708 for communicating with the bank application 516 (FIG. 6) and external clearing house/SWIFT systems or other payment systems.

Figure 8:
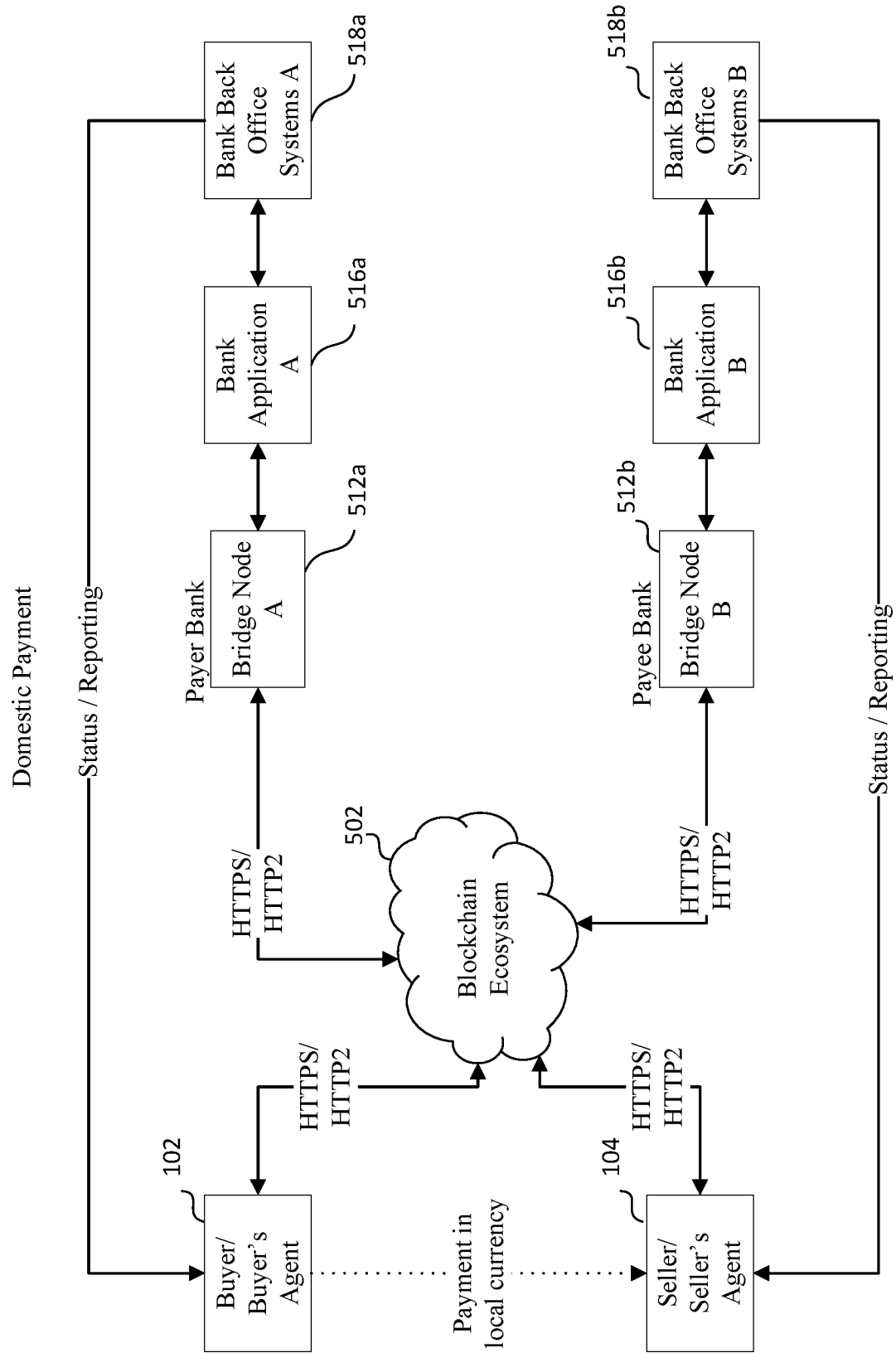
FIGS. 8-11 illustrate different types of payment transactions.

FIG. 8 illustrates processing of a simple domestic payment using the above architecture. Here, the buyer or buyer's agent and the seller or seller's agent conduct a transaction on blockchain system 502 for the transfer of a digital asset. A corresponding financial transaction is initiated between the payer's bank (associated with the buyer 102) and payee bank (associated with the seller 104). The payer bank and payee bank each include a respective bridge node 512a, 512b for interfacing with the blockchain system 502. Each bridge node communicates with respective bank applications 516a, 516b and back office systems 518a, 518b to carry out the corresponding conventional money transaction.

Figure 9:
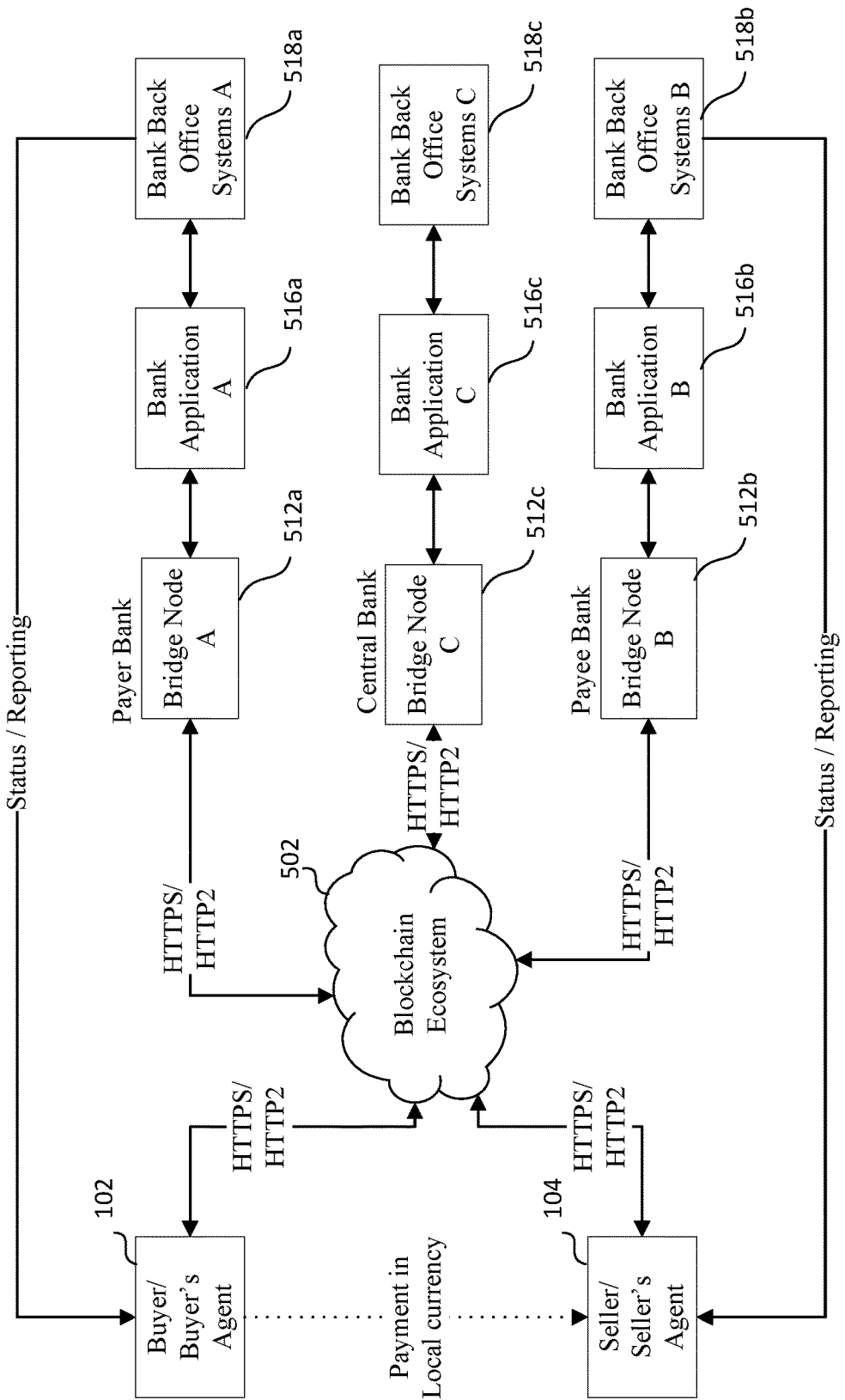

FIG. 9 illustrates a similar transaction but in this case involving settlement via a central bank, with the central bank having its own instances of the bridge node 512c and application 516c for interacting with its back office systems 518c.

Figure 10:
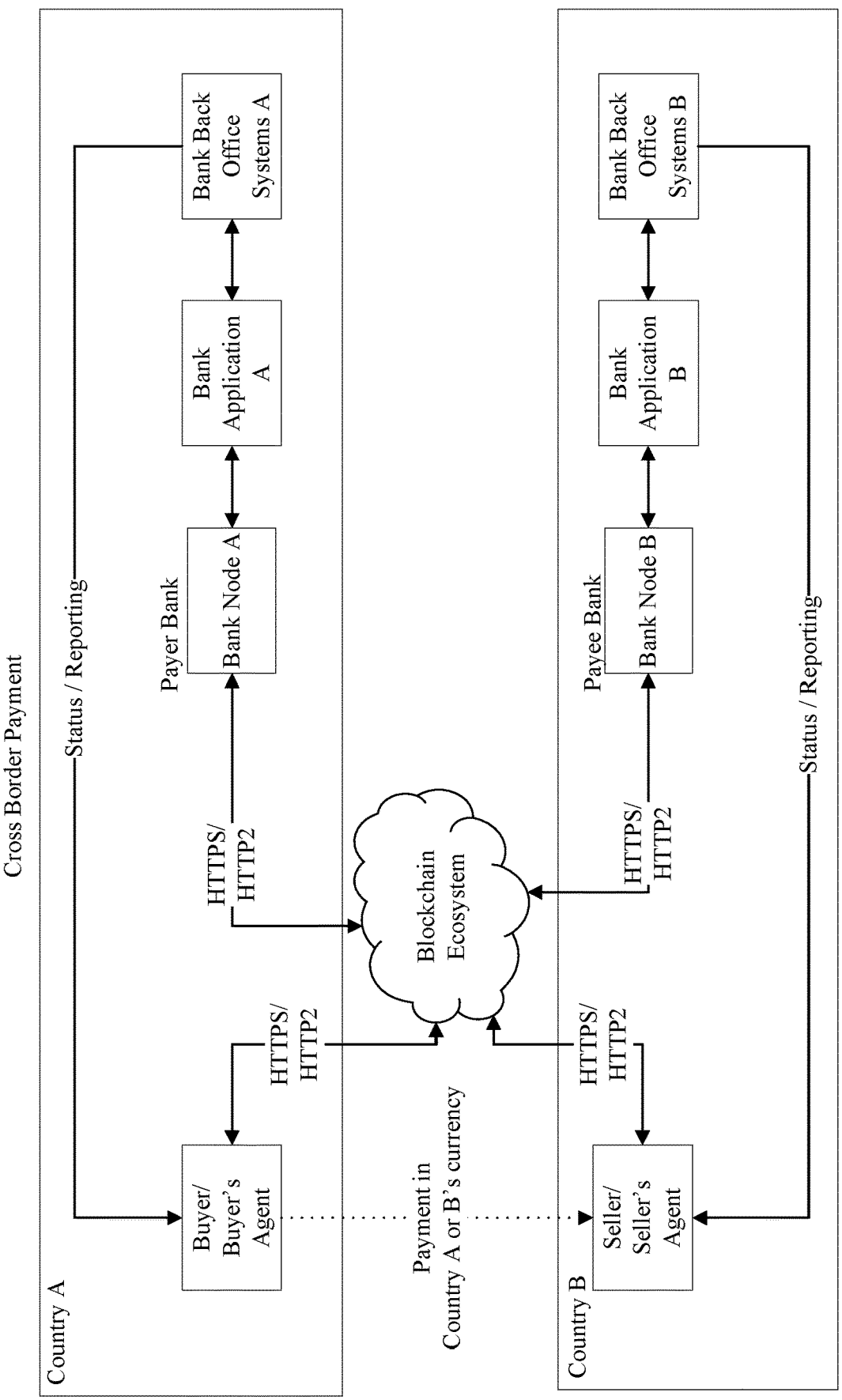
Figure 11:
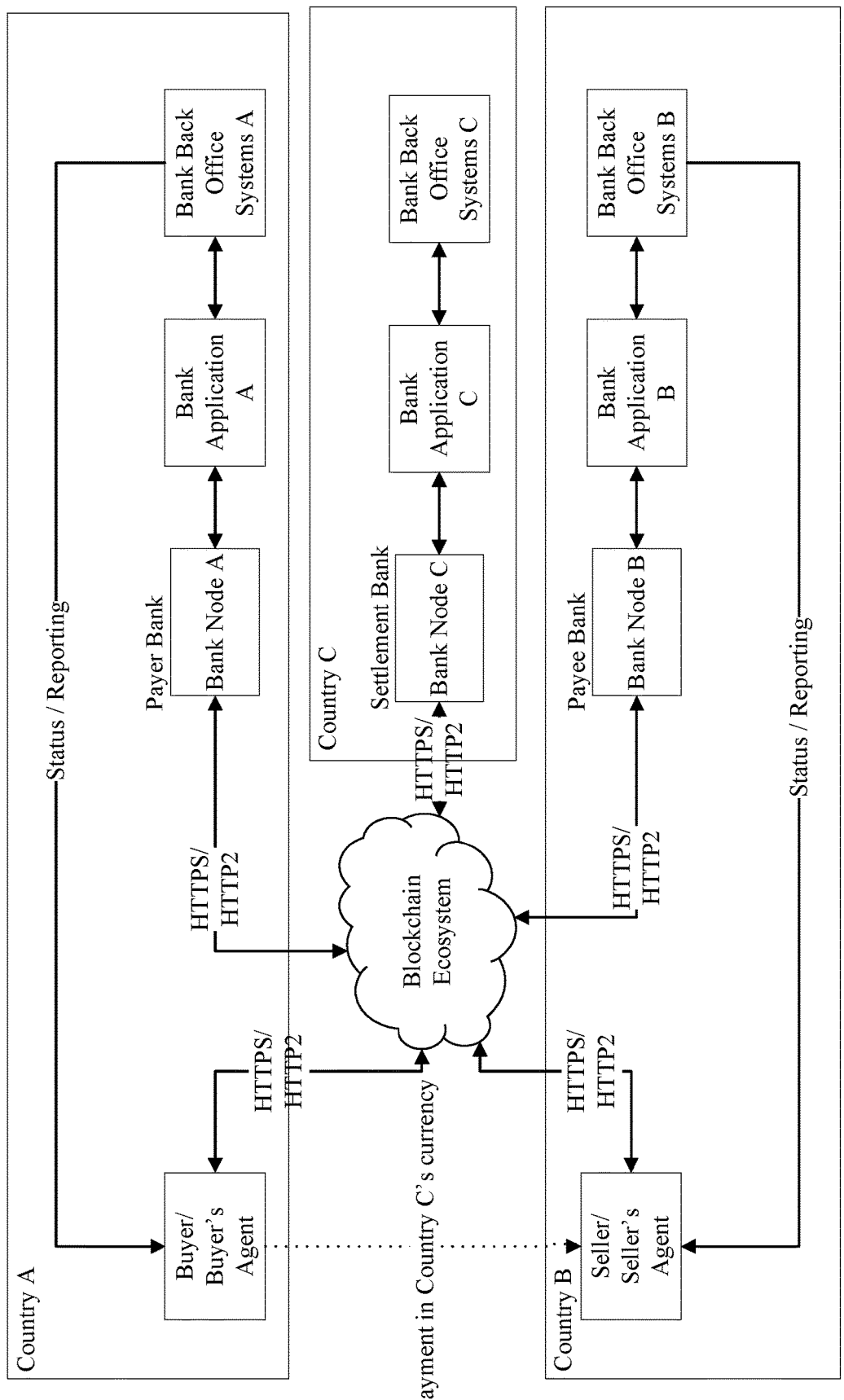

FIG. 10 illustrates a cross-border transaction between two parties and FIG. 11 shows a cross-border transaction with settlement via a central bank, in this example located in a third country (but alternatively the central bank could be located in the same country as the payer or payee bank).

Referring back to FIG. 6, payment transactions are controlled via a set of microservices 606, specifically a "load" service 608, an "update" service 610 and an "unload" service 612. These services are invoked by corresponding mirror value smart contracts 408b, 408c, 408d (FIG. 4) to control payment operations in the banking system in conjunction with a mirror transaction on the blockchain, to keep blockchain operations synchronized with the real-world payment flow. These smart contracts and microservices thus cooperate to implement a set of distributed, synchronized operations that are coordinated across the blockchain system and the payment processing system. Where reference is made herein to the "load", "update", and "unload" operations it shall be understood that this generally refers to processing performed cooperatively by the smart contracts 408b, 408c and 408d on the blockchain and by the services 608, 610, 612 at the payment processing system/bank application (unless required otherwise by context).

The "load", "update", and "unload" operations will now be described in more detail with reference to FIGS. 12A-12C.

The operations are based on performing a mirror operation for each movement of real funds in the banking system. Such transactions use virtual accounts on the blockchain storing representations of real funds referred to as "mirror values". As shown in FIG. 12A, the system maintains a global mirror account 1216, along with mirror accounts 1212 for the sender and 1214 for the receiver. Each account may be identified on the blockchain using a unique identifier, such as a user identifier for sender/receiver accounts 1212/1214. Each sender and/or receiver using the system may have a single persistent mirror account on the blockchain, or alternatively such accounts may be transient and created for a specific transaction, since their purpose is to reflect, temporarily, the real-money transactions occurring in the banking system.

The real-money transaction occurs between sender account 1202, receiver account 1206, and an intermediary entity, in the form of bank holding account 1204. This is a physical account (as illustrated in FIG. 2) and may be a suspense account owned by the bank that is kept in the bank ledger (in the core banking system), and is typically ring fenced to keep the monies used in the blockchain ecosystem. The holding account 1204 may include logical sub-accounts for sender (1208) and receiver (1210) for temporarily holding funds during transactions (as illustrated in FIG. 2). The holding account 1204 is associated with a corresponding mirror on-chain account referred to as the global mirror account 1216. The balance of the holding account 1204 reflects the sum of monies being processed in the blockchain ecosystem at any time. At initialization or when there are no pending transactions, the holding account 1204 and global mirror account 1216 preferably both have zero balances.

Figure 12A:
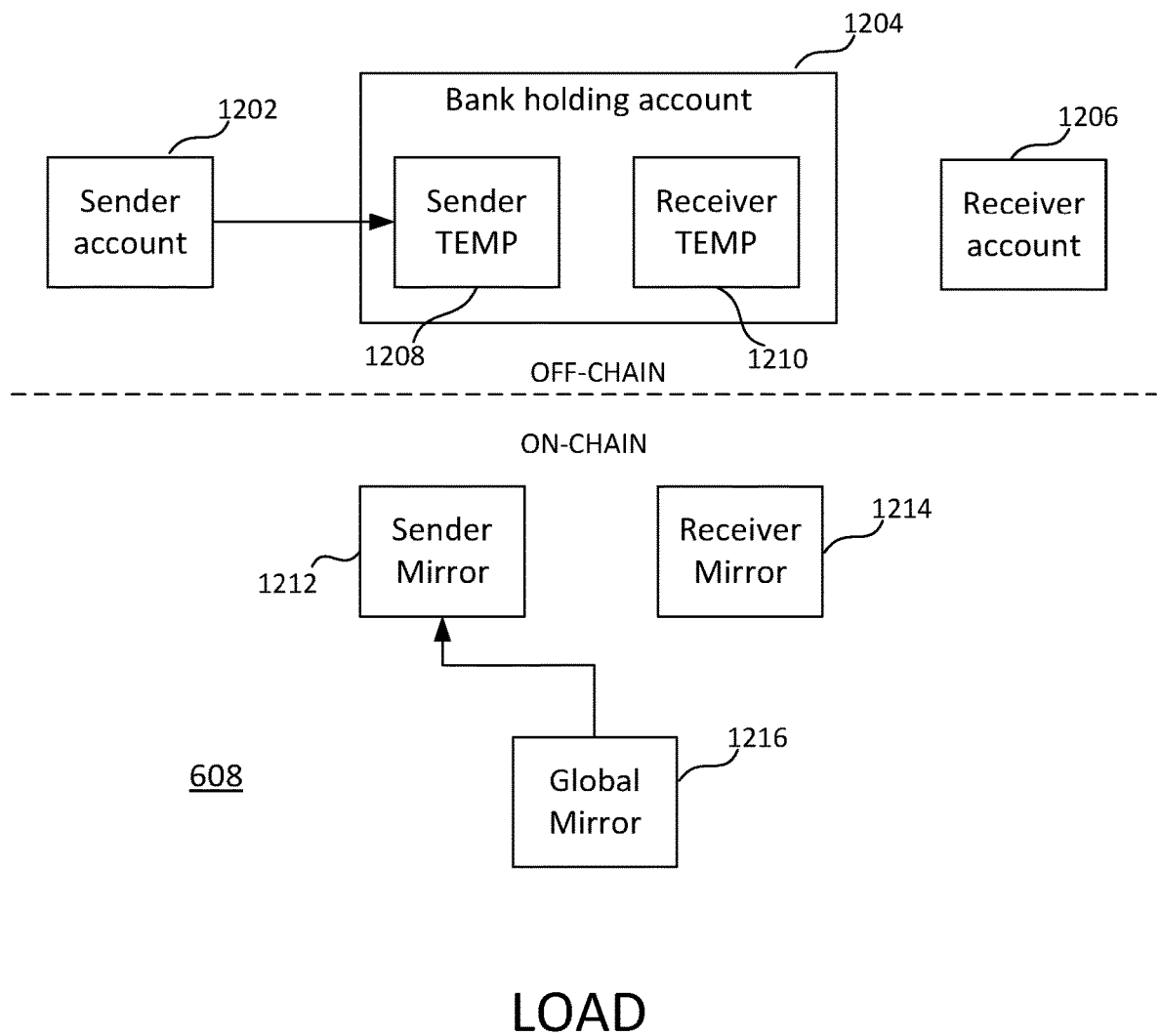
FIGS. 12A-12C illustrate load, update and unload operations used to perform synchronized transactions.

FIG. 12A illustrates the load operation.

The load operation is triggered by a main workflow running on the blockchain (this may e.g. include the digital asset transaction 122 of FIG. 1). In one implementation, a payment smart contract on the blockchain interacts with the main workflow by picking up the payment instruction and performing authentication and authorization. It then triggers a call to the load smart contract 408b (FIG. 4) which in turn invokes an API call to the load service 608 at the bank application 516, which together perform a set of operations to synchronously effect transfer of real funds and a corresponding mirror value transaction that is recorded on the blockchain.

In particular, a mirror value operation is performed on the blockchain which debits the transaction value from the global mirror account 1216 and credits that same transaction value to the sender mirror account 1212.

The sender's real money account 1202 is also debited and the holding account 1204 is credited in the amount of the transaction value. The funds are associated with the logical sender sub-account 1208.

It will be noted that, if the net values are calculated, the on-chain sum will be zero (the sender mirror credit matches the global mirror debit) and the off-chain sum is similarly zero. Overall, the net sum between global mirror 1216 and holding account 1204 is also zero.

The load operation generates an ACK (acknowledgement) or NAK (non-acknowledgement) to confirm the success or failure of the transaction. The system may additionally calculate control sums between accounts to ensure they are synchronized at the end of each transaction. In the event of failure, the entire transaction may be aborted and the operations carried out so far may be reversed.

Figure 12B:
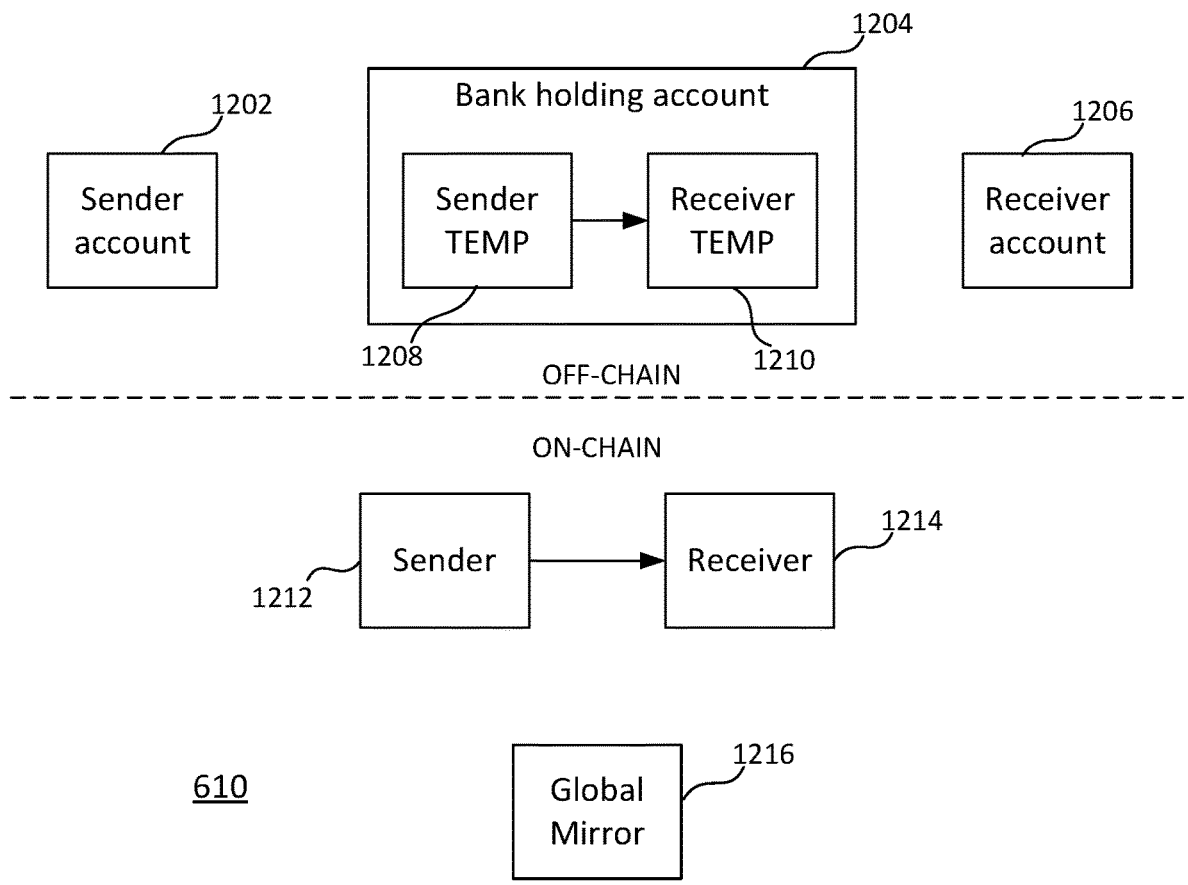

FIG. 12B illustrates the update operation 610, which moves the mirror value from the sender to the receiver on the blockchain (using the update smart contract 408c which invokes the corresponding update service 610 at the payment processing system).

Specifically, on the blockchain, the transaction value is debited from the sender mirror account 1212 and credited to the receiver mirror account 1214. In the holding account 1204, a corresponding transaction transfers the transaction value from the sender subaccount 1208 to the receiver subaccount 1210. The off-chain sub-account 1210 enables full tracking of the transaction for payment transparency purposes.

The operations issues an ACK/NAK response indicating success or failure as above, and control sums may be calculated after completion of both sub-operations, to check that net balances (on-chain, off-chain and between on-chain accounts and holding account 1404) are zero as expected.

Figure 12C:
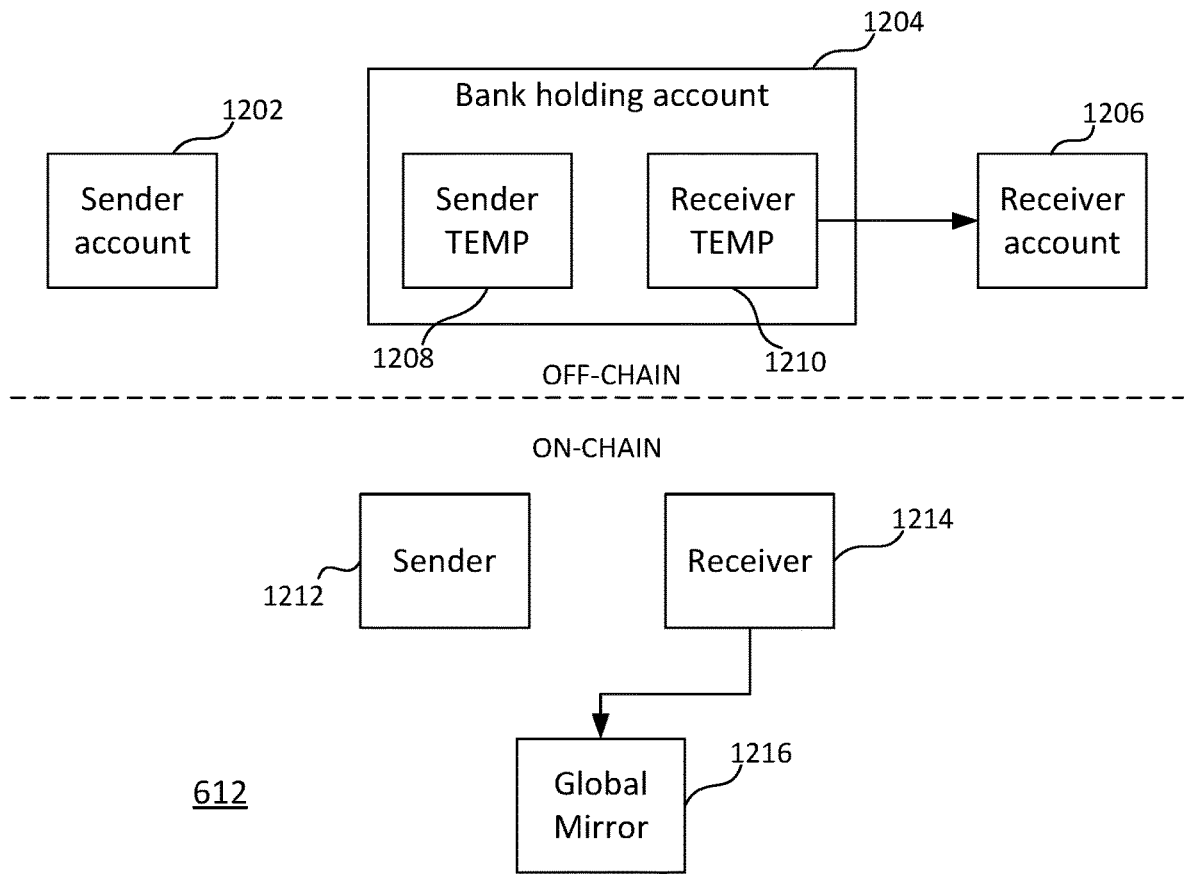

FIG. 12C shows the unload operation 612. This again includes two sub-operations (performed by the unload smart contract 408b on the blockchain and the unload service 612 at the payment processing system).

On the blockchain, the transaction value is debited from the receiver mirror account 1214 and credited to the global mirror account 1216. At the banking system, the transaction value is debited from the receiver subaccount 1210 of the holding account 1204 and credited to the receiver account 1206.

As before, an ACK/NAK response is issued indicating success or failure and control sums may additionally be calculated after completion of both sub-operations to check that net balances are zero.

In the event of a failure at any of the load, update and unload stages, the overall transaction may be aborted and the system state may be rolled back to the state prior to the start of the transaction (e.g. including returning the real money funds to the sender account and reversing any mirror value operations, as applicable). Since the mirror value transaction data reflects the status of the payment transaction so far, this data can be used to perform a controlled rollback, by reversing the steps of the transaction carried out so far.

Assuming all three stages of the transaction completed correctly, the on-chain ledger will have returned to its state prior to the load operation (e.g. mirror accounts 1212/1214/1216 will all have returned to zero balances), and the real-money funds will have moved from sender account 1202 to receiver account 1206.

As discussed above, the load, update and unload operations comprise on-chain operations (involving updates to mirror value data stored on the blockchain). These operations call the respective microservices in the core banking system via an API. The core banking microservices take instructions from the load, update and unload smart contracts to implement the corresponding real-money movements for each distinct stage of the payment processing transaction, and return acknowledgements to confirm whether or not the money transfers were successfully completed.

In the described configuration, the three steps of Load, Update and Unload are consecutive, so after each transaction there is zero on-chain balance. Other configurations are possible. For example, a single Load operation could be performed to create an on-chain balance which can be used for all transactions on the next day. Those transactions are then mirrored by update operations as described above. A single Unload operation may be performed e.g. at the end of the day. This could allow a user to pre-fund multiple transactions by performing a single load, with multiple update operations (possibly to different receivers) implementing individual transactions.

Figure 12D:
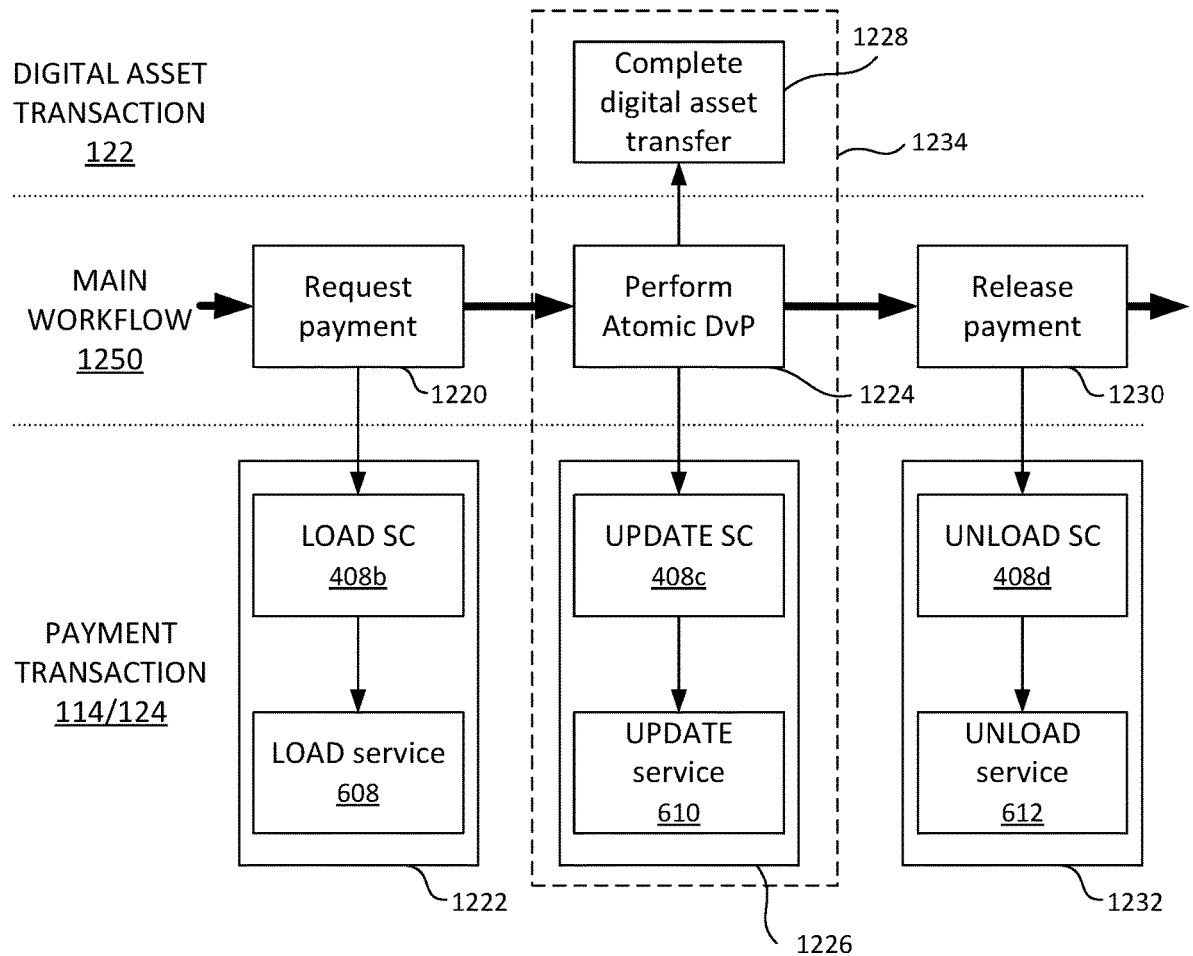
FIG. 12D illustrates integration of the load, update and unload operations into a blockchain transaction workflow.

FIG. 12D illustrates how the load, update and unload operations can be integrated into and synchronized with a digital asset transaction. FIG. 12D shows a main workflow 1250 which carries out the digital asset transaction 122 (as shown in FIG. 1), and triggers the payment transaction (comprising the mirror value transaction 124 and real money transfer 114 of FIG. 1) such that it is performed synchronously with the digital asset transaction.

In step 1220, the main workflow requests initiation of the payment transaction. Prior to step 1220, various preparatory steps may have been carried out by the main workflow, such as user authentication, verifying ownership of the digital asset etc. In response to initiating the payment request, in step 1222 a load operation loads the mirror value and transfers the payment amount from the payer to a holding account as depicted in FIG. 12A. This involves a call to the load smart contract 408b which performs the mirror value load and invokes the corresponding load service 608 at the payment system to initiate the funds transfer. This preparatory step ensures that the funds are available and reserved (in the holding account) to ensure that the transaction can be completed.

In step 1224, the atomic delivery-versus-payment operation is performed. This involves two coordinated steps: in step 1228, the digital asset is transferred. For example, for a digital asset represented by one or more crypto-tokens on the blockchain, ownership of the tokens is transferred on the blockchain using the appropriate blockchain operation(s) (e.g. implemented via dedicated smart contracts). This involves storing updated ownership information specifying the new owner of the asset/token to the blockchain. In step 1226, the update operation is performed as per FIG. 12B, which moves the mirror value from the sender identity to the receiver identity on the blockchain, and transfers the payment amount from the logical holding account 1208 associated with the sender to the logical holding account 1210 associated with the receiver. This involves a call to the update smart contract 408c which performs the mirror value update and in turn invokes the update service 610 at the payment processing system to perform the real money transfer.

Steps 1226 and 1228 may be performed simultaneously or in any order but are performed as a single atomic operation or transaction 1234, such that, if either step fails for any reason, the operation is rolled back and the system is placed back in the state it was in prior to those steps. For example, if the asset cannot be transferred in step 1228, then the mirror value transfer performed by the update operation 1226 (FIG. 12B), assuming it was completed, is reversed to move the mirror value back to the sender identity and transfer the payment amount back to the logical account 1208 associated with the sender. Similarly, if the mirror value update fails then the transfer of the asset is reversed. Thus, either both steps 1226 and 1228 complete successfully, or neither completes.

Once both steps have successfully completed, the main workflow continues to step 1230 where it triggers release of the payment to the recipient, by invoking the unload operation 1232 as depicted in FIG. 12C. This causes the mirror value to be moved from the receiver identity on the blockchain to the global mirror account and the payment amount to be transferred from the logical holding account associated with the receiver to the receiver account. As above, this step involves a call to the unload smart contract 408d which performs the mirror value unload operation and in turn invokes the unload service 612 at the payment processing system to initiate the funds transfer.

FIGS. 12A-12D illustrate a simple settlement model, e.g. where the sender and receiver accounts are at the same bank. For interbank transfers or transfers via a third-party bank, the operations may vary. For example, where a settlement bank is involved, additional bank transfer steps are involved which may be reflected by additional load/update/unload operations.

Figure 12E:
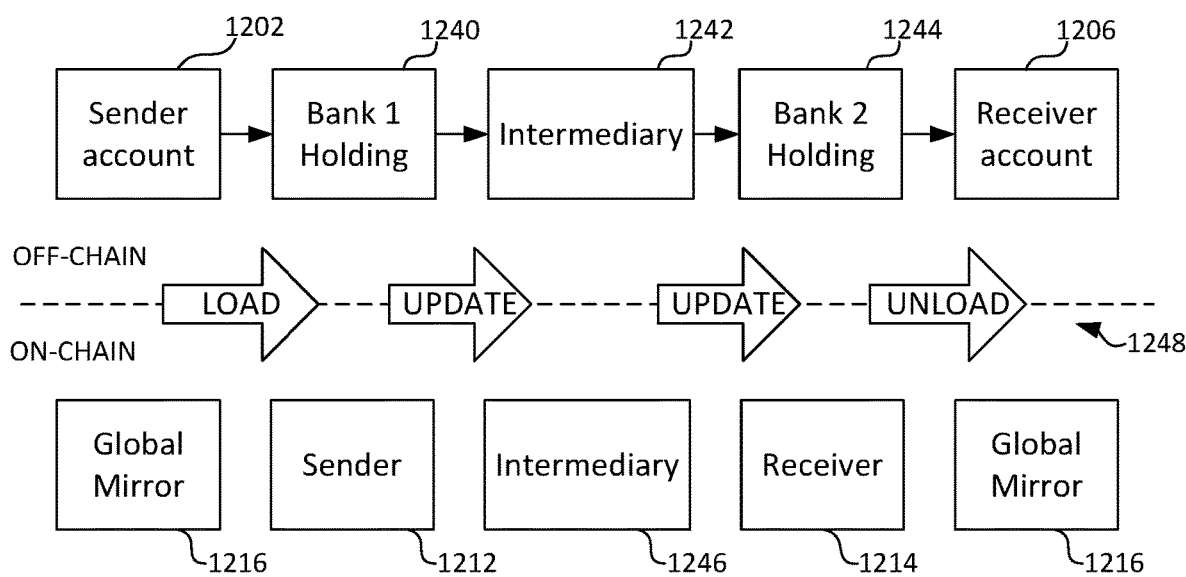
FIG. 12E illustrates an alternative transaction structure.

Generally speaking, the load, update and unload operations can be used to build a variety of more complex transactions. Typically, for transactions involving some intermediary entity or entities, additional mirror value accounts can be added to represent the intermediate accounts through which the real money passes. An example is shown in FIG. 12E, where some payment intermediary 1242 is reflected by a corresponding mirror identity/account 1246. The sequence 1248 of load, update and unload operations includes two update operations in this example to mirror the real-world money movement in the blockchain mirror value database. In particular, the real money transfer may occur via a holding account 1240 at a first bank, the intermediary entity 1242, and a holding account 1244 at a second bank, with the update operations moving the corresponding mirror value from sender identity to receiver identity via the intermediary identity/account 1246 on the blockchain.

It will of course be noted that the real-money transaction may include any number of accounts, which may include logical and physical accounts (at one or more financial institutions and possibly in distributed across multiple territories), and which may be mirrored by a corresponding set of mirror identities/accounts (sender, receiver, intermediaries etc.) with an appropriate sequence of load, update, and unload operations. In each case, the load, update and unload operations interface via APIs with the relevant banking systems to trigger the required real-money transfers.

Furthermore, instead of a single global mirror value, different institutions may maintain distinct global mirror values. In that case, additional load/unload operations could be added to the transaction chain as needed.

Thus, the provided operations can be used to construct a wide range of transaction types, depending on the specific requirements of a given application. Purely by way of example, some specific examples of transaction flows are illustrated in FIGS. 13 and 14A-14C.

Figure 13:
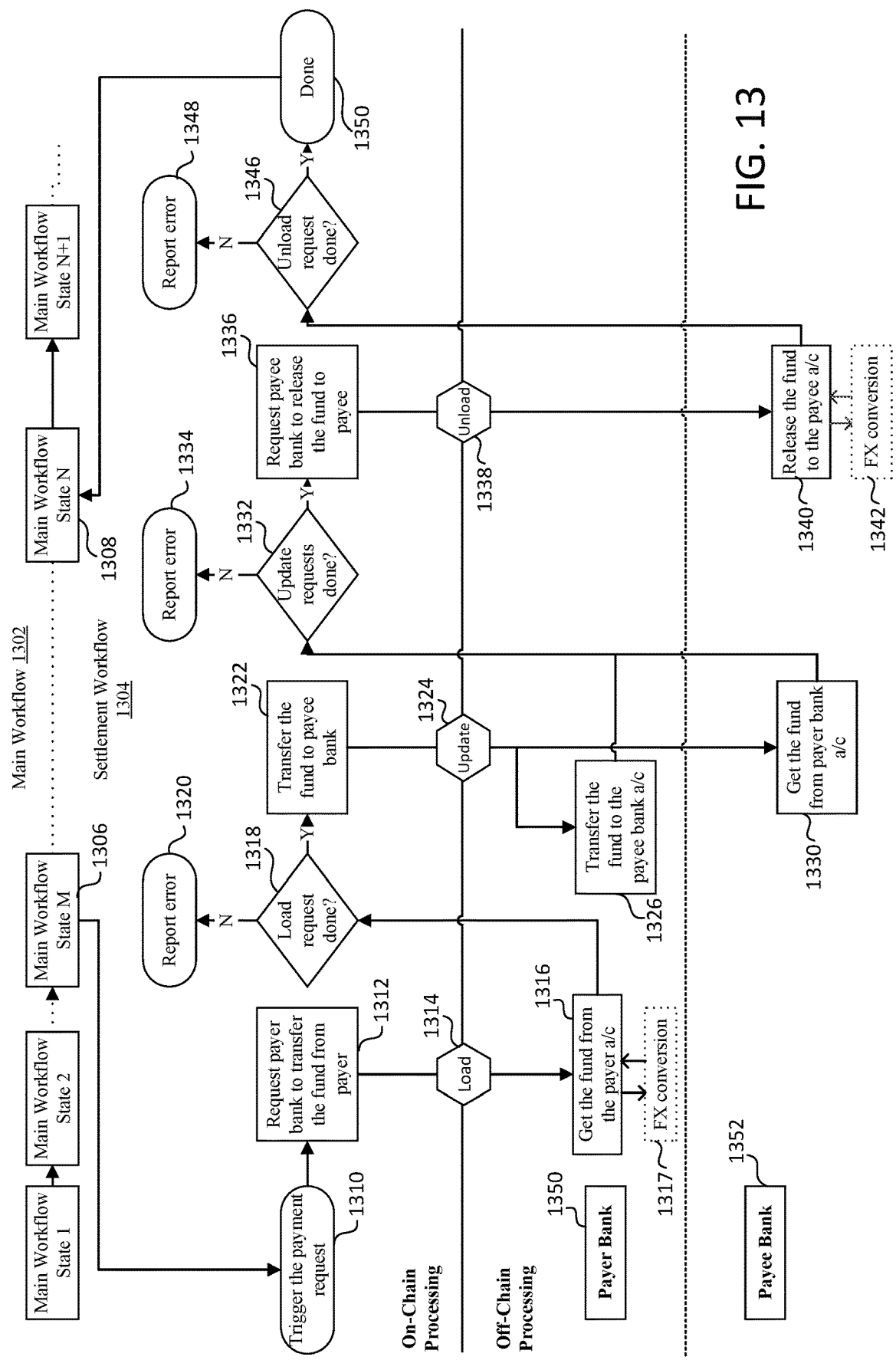
FIG. 13 illustrates a process flow for a blockchain transaction without settlement intermediary.

FIG. 13 illustrates a process flow for processing a payment between two entities (e.g. as per the FIG. 8/FIG. 10 examples), e.g. for sender and receiver accounts at different banks. FIG. 13 illustrates a main workflow 1302 and a settlement workflow 1304. The main workflow 1302 may, for example, represent a process involving a digital transaction on the blockchain. The settlement workflow 1304 implements the corresponding real money payment transaction and involves sending instructions to banking systems to perform the off-chain part of the transaction whilst maintaining a mirror transaction on the blockchain.

The process starts with a given state 1306 in the main workflow triggering a payment request in step 1310. The payment request specifies a transaction value, i.e. a real money quantity to be transferred between payer and payee. In response, in step 1312 a request is issued to the payer bank 1350 to transfer the specified amount of funds from the payer. This involves invoking a load operation 1314 to load a mirror value corresponding to the transaction value to the blockchain and obtain the corresponding quantity of real funds from the payer's account in step 1316 and place them in a holding account. Currency conversion may be performed as needed in step 1317.

In step 1318 it is determined whether the load request has been successfully completed. If not, an error message or report is generated in step 1320 and transmitted to relevant parties, e.g. the buyer (agent) and/or seller (agent) systems. If the load was successful, the relevant funds are now in the holding account and a corresponding mirror value has been allocated to the sender on the blockchain. In step 1322, transfer of the funds to the payee bank is initiated. An update operation 1324 is performed on the mirror value in the blockchain, which triggers the transfer of the funds from the payer bank account to the payee bank in step 1326, where they are received in step 1330.

In step 1332 it is determined whether the update requests have been completed. If not, an error is reported in step 1334 (as described for step 1320). If the update operations were successful, then a request is sent to the payee bank to release the funds to the payee. The payee bank then performs an unload operation 1338 to unload the mirror value from the blockchain and releases the funds to the receiver bank account in step 1340 (performing any necessary currency conversion in step 1342).

In step 1346, it is determined whether the unload request was successfully completed. If not, an error is reported (1348) as previously described for step 1320. If successful, then the process completes in step 1350. Completion is reported to the main workflow resulting in a new workflow state 1308. For example, at this point the main workflow can continue with any post-transaction operations, e.g. reporting successful completion etc.

In the described system, the blockchain processing thus serves as the controlling (master) system, and the core banking system transaction is under control of the blockchain transaction (e.g. as a subordinate transaction). The core banking system is essentially passive in that it receives the payment instruction or payment triggered by the blockchain conditions.

Note also that FIG. 13 has been simplified to focus on the settlement workflow. As discussed in relation to FIG. 12D, after a successful load operation (1318) control may return to the main workflow to trigger the atomic payment versus delivery operation which in turn implements the digital asset transfer and triggers the update 1324. Upon completion of those (1332) control may again return to the main workflow, which then triggers the unload operation 1338 as previously described. However, other control flows are possible (including one where control only returns to the main workflow at 1350 as depicted, with the digital asset transfer performed at that point).

Figure 14A:
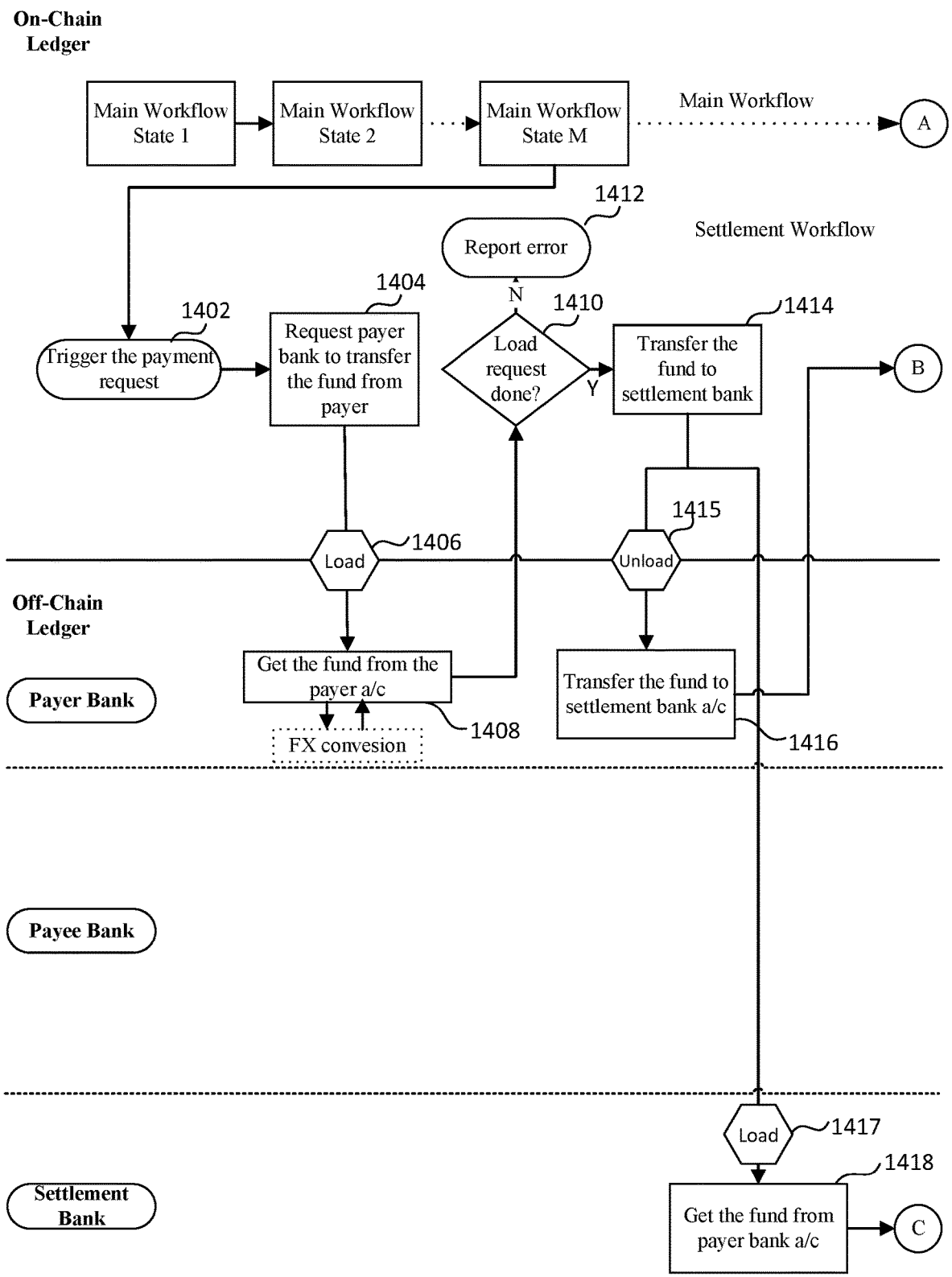
FIGS. 14A-14C illustrate a process flow for a transaction involving a settlement intermediary.
Figure 14B:
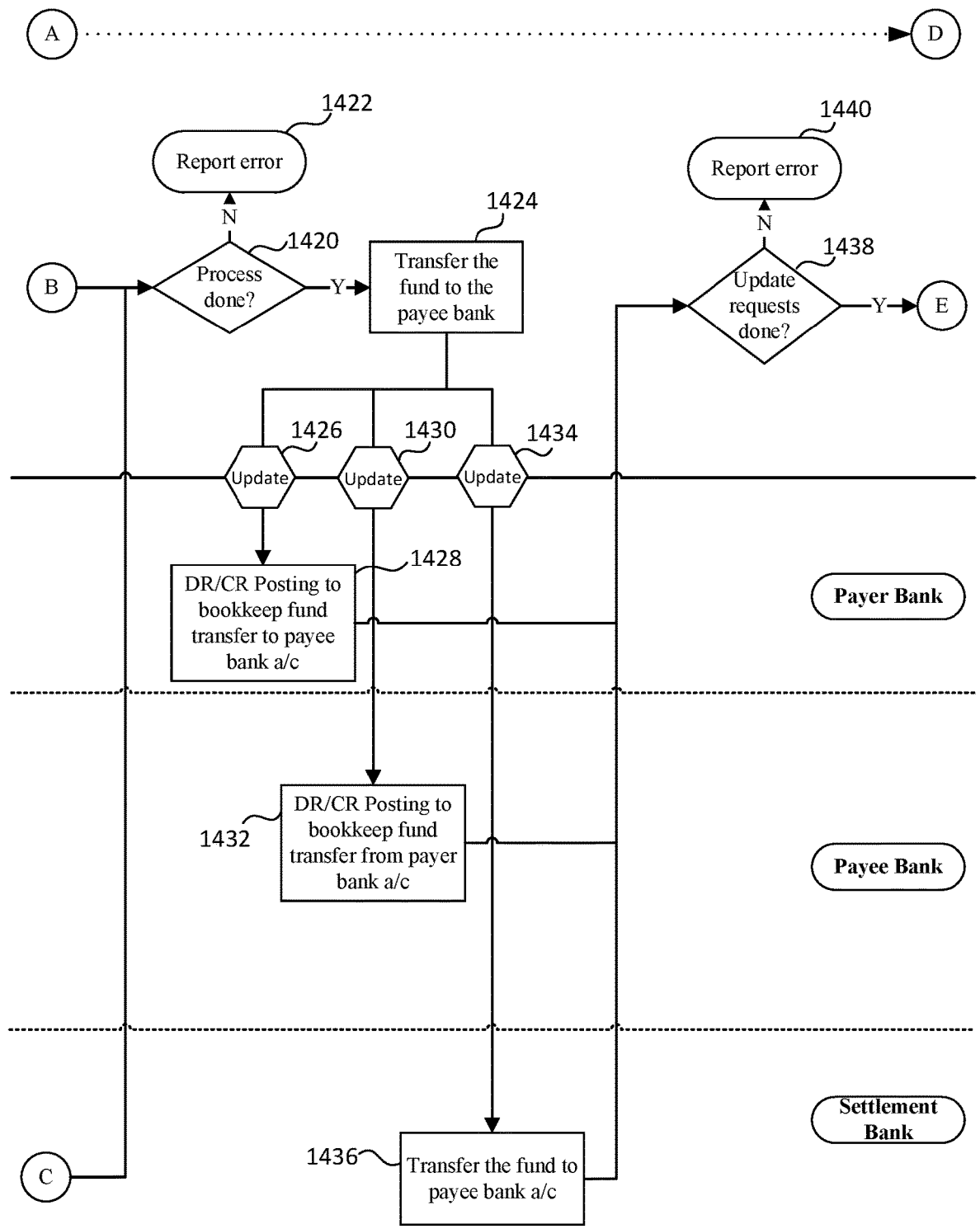
Figure 14C:
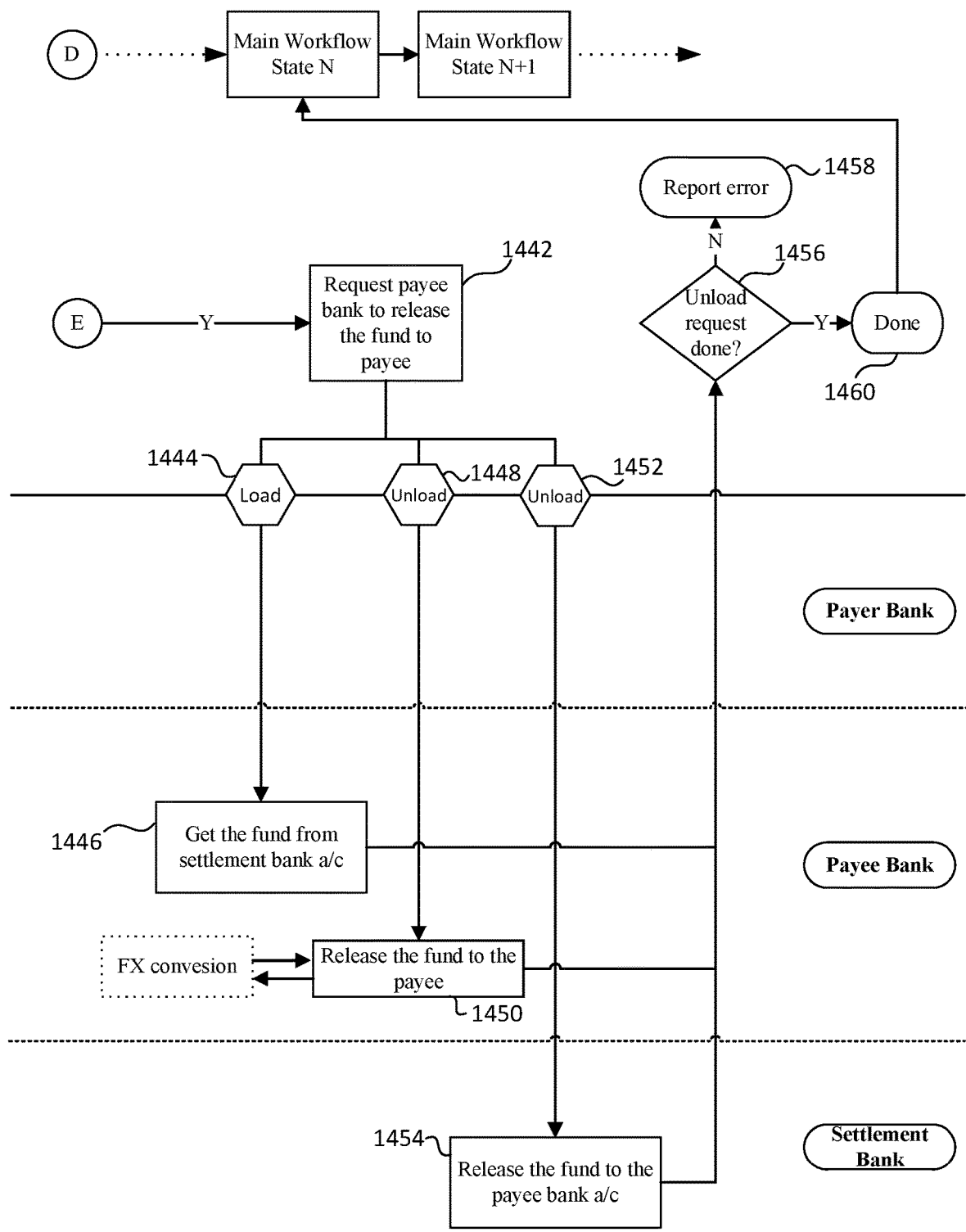

FIGS. 14A-14C illustrate a corresponding process flow for a transaction involving three entities (payer, payee and settlement bank). The process starts as in FIG. 13 with triggering of the payment request (1402), a request to the payer bank to transfer funds (1404), a load operation (1406) and the funds being obtained from the payer account 1408. If the load request was unsuccessful (1410), an error is reported (1412); otherwise transfer of the funds to the settlement bank is initiated (1414). The transfer then involves, at the payer bank, an unload operation 1315 to unload the mirror value recorded on the blockchain in operation 1406 and transferring the funds to the settlement bank's account (1416). At the settlement bank, a load operation 1417 loads the mirror value to the blockchain and the funds are received from the payer bank (1418).

Continuing on FIG. 14B, in step 1420 the process determines whether the funds transfer to the settlement bank has been completed; if not an error is reported in step 1422 as previously described. If successful, then transfer of the funds to the payee bank is initiated in step 1424. This involves respective update operations 1426, 1430, 1434 to update the mirror values and initiate payment transactions 1428, 1432 and 1436 to complete the funds transfer.

In step 1438, the process determines whether the update requests have been successfully completed. If not, an error is reported (1440) as previously described. If the updates completed successfully, the process continues to step 1442 on FIG. 14C, where the payee bank is requested to release the funds to the payee. This involves steps at the settlement bank of an unload operation 1452 to update the mirror value on the blockchain and release the funds to the payee bank account (1454). At the payee bank, the funds are obtained from the settlement bank account (1446), with a load operation 1444 to update the mirror value on the blockchain, and an unload operation 1448 releases the funds to the payee in step 1450, with a corresponding update the mirror value on the blockchain.

In step 1456, the process determines whether the unload requests have been completed. If not, an error is reported (1458) as described previously. If successful, the process completes (1460), the main workflow state updates, and the main workflow can continue (e.g. by completing the digital asset transaction or other operation that is dependent on the payment transaction). Once again FIGS. 14A and 14C are simplified and control may return to the main workflow at a suitable point (e.g. 1420), with the update operations 1426, 1430, 1434 performed as part of the atomic delivery versus payment operation under control of the main workflow, and the main workflow triggering the final stage (e.g. from 1442) once that operation has been completed, as previously described.

Figure 15:
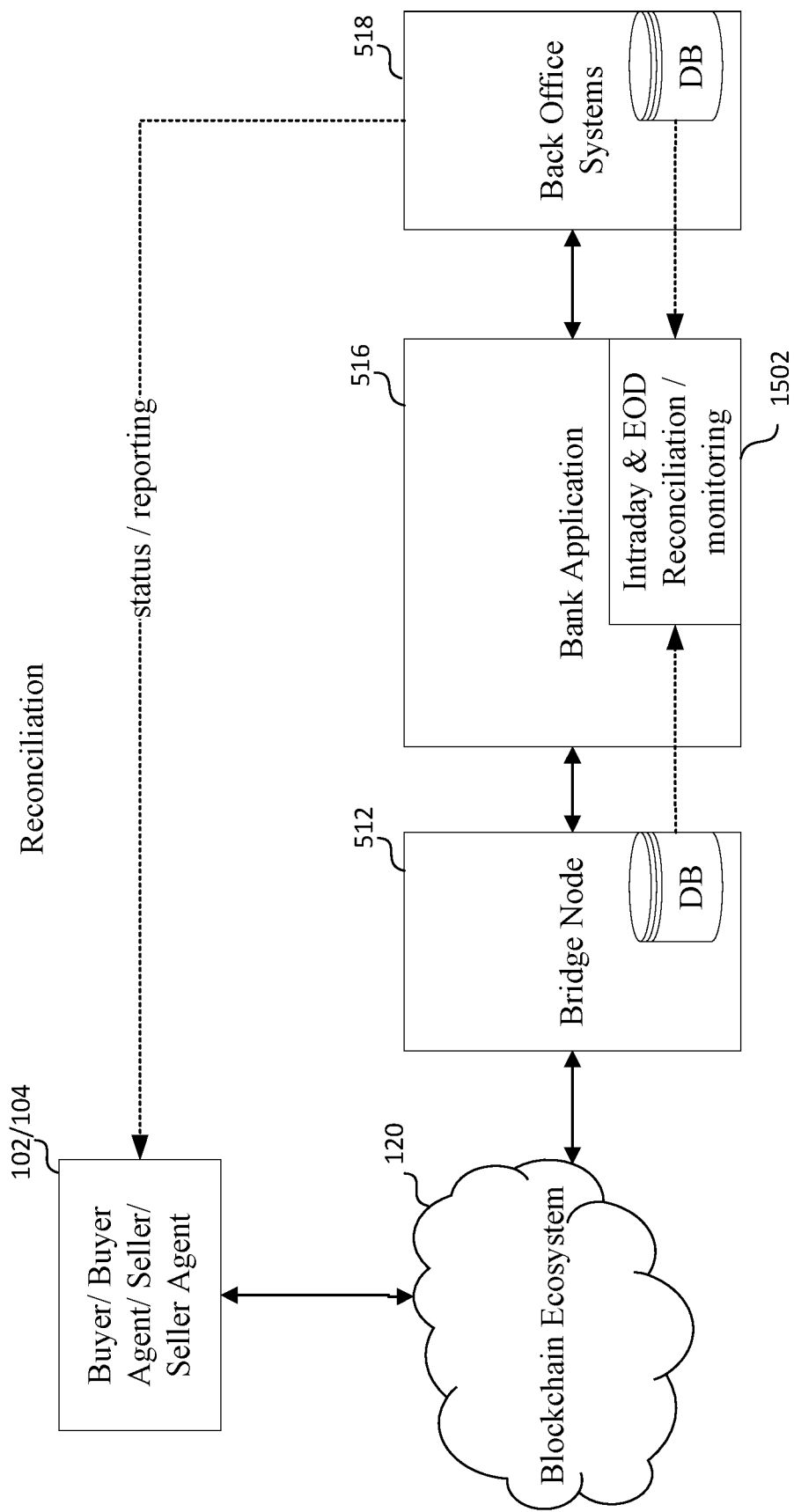
FIG. 15 illustrates a reconciliation workflow.

FIG. 15 illustrates a reconciliation process. This performs reconciliation (e.g. intraday and/or end-of-day, EOD) between the transaction records stored on the blockchain 120 and those at the bridge node 512 and back office systems 518. Reconciliation may be performed by a reconciliation module 1502 as part of the bank application 516, or could be provided as a separate component. Reconciliation could be performed, for example, hourly, daily or at some other frequency. The reconciliation can ensure correct synchronization between blockchain and bank ledger, e.g. in case of failed transactions. As described further below, at the end of the day the system also calculates a starting balance for the next day, and this is also verified with the core banking ledger during reconciliation.

As shown in FIG. 13 (and equivalently FIGS. 14A-14C), the financial settlement 1304 transaction is linked to the main workflow 1302. With reference to FIG. 1, the main workflow corresponds to (or incorporates) the digital asset transaction 122. The settlement workflow corresponds to the real money transaction 114 and synchronized mirror value transaction 124. The financial settlement and digital asset transactions are coordinated as a single delivery-versus-payment (DVP) transaction which ensures completion of the digital asset transaction in exchange for the receipt of the stipulated payment amount. To maintain coordination, the system generates a DVP reference which is shared by the digital asset transaction 122 and the real money transaction 114. This reference number ensures the matching of digital asset transfer and real money transfer. This single reference is further broken down into three reference numbers for the Load, Update and Unload operations.

Thus, in the described system, the mirror value transactions, as implemented by the load, update and unload operations, allow the real-money transaction to be precisely controlled and tracked, with the mirror value database (on the blockchain) tracking individual stages of the real-money transfer. This ensures that the transaction can be rolled back in case of a problem. For example, assume that in FIG. 13 the release of funds to the payee account in step 1340 fails. The state of the mirror value transaction reflects the state of the real money transaction up to that point (e.g. that funds have moved to the payee bank), and so suitable remedial action can be taken, e.g. retrying the final step, or reversing the transfer steps carried out so far. Only once all steps have been successfully completed (and reflected in the mirror transaction data) is the money transaction complete, allowing the main workflow (e.g. the digital asset transaction on the blockchain) to complete.

As depicted in FIGS. 13-14, the payment transaction is triggered in response to the main workflow (e.g. the digital asset transaction of FIG. 1) reaching a particular defined state. This is the state involving triggering of the payment request (see step 1310). For example, the main workflow could involve establishing any necessary parameters for the transaction (identifying the asset to be traded, payment amount, etc.), authenticating parties and so on. The coordinated transaction involves as a first step the initial load operation (FIG. 12A) which reserves funds for the transaction and mirrors that reservation in the mirror transaction data. The completion of the digital asset transaction (which could be transfer of a digital asset, e.g. tokenized asset stored on the blockchain, or completion of a digital contract for a physical asset) then occurs as an atomic operation together with the update operation (FIG. 12B), which serves to allocate the reserved funds from the sender to the receiver (using the logical holding accounts), again reflecting that step in the mirror transaction data. Once the atomic operation has succeeded, the funds are released to the payee via the unload operation (FIG. 12C), which also updates the mirror transaction data accordingly. The main workflow can then complete.

PROCESS FLOW—EXAMPLE

The following describes in more detail a process flow for carrying out a delivery-versus-payment (DvP) transaction, in accordance with an embodiment.

In the following process description, certain terms are used as follows:

Platform operator: the exchange that acts as the platform for trade matching and controls when the DvP transaction is initiated Payment processor: the financial institution (e.g. bank) that acts as intermediary to facilitate cash settlement Sender: the client that is going to buy a digital asset on the platform and is sending payment.

Receiver: the client that is selling the digital asset on the platform and will receive payment.

Signatory: authorized signature for approving blockchain transactions

Step 1) The DvP trade is inputted by the platform operator, specifying the trade details, and the trade is recorded on-chain. The trade details include the trade participants and payment amount for the traded asset and trading price. The current status of the DvP trade smart contract is "proposed".

Step 2) The sender submits a Load Request with signature of the payment processor to top up the mirror value account.

Step 3) The payment processor replies to the Load Request with a Load Acceptance as an acknowledgement to the sender. After the Load Acceptance is issued, the mirror value top up process is completed, with the sender identity mirror value account credited with the stated payment amount, while the traditional bank account has been debited as described above.

Step 4) The sender then issues an Update Request with signature of the payment processor to produce a Pending Movement for the DvP process.

Step 5) The payment processor replies to the Update Request with an Update Acceptance and Pending Movement. At the same time, in the core banking system of the payment processor, the stated amount of money is sent from the sender's logical holding account to the logical holding account associated with the receiver.

Step 6) The platform operator consolidates the pending movement together with the trading smart contract and the reference of the traded asset to compose the DvP blockchain transaction. The DvP is performed in an atomic manner. After the blockchain transaction is recorded on the blockchain successfully, the ownership of the traded asset changes, and the Pending Movement is consumed to produce the Movement for both sender and receiver.

Step 7) The payment processor keeps monitoring the blockchain; once the Movement is finalized on the blockchain, the status of the money in the mirror value account is unlocked; or else, if the Pending Movement cannot be finalized within a certain period, the Pending Movement is consumed by the payment processor in order to surrender the current trade, and mirror value amount in the mirror value of the receiver is transferred back to the mirror value account of the sender.

Step 8) The receiver, or the sender if the trade is surrendered, issues an Unload Request with signature to unload the mirror value corresponding to the payment amount from the mirror value account and move the real money amount to their traditional bank account.

Step 9) The payment processor will reply the Unload Request with an Unload Acceptance. After the Unload Acceptance is issued, the mirror value unload process is completed, the mirror value account of the sender is debited with the stated payment amount, while the traditional bank account is credited.

The following provides a pseudo-code summary of the transaction steps for a transaction in which an asset "asset1" is traded from seller A to buyer B:

1. Ensure asset1 belongs to A and is ready to be traded
2. Lock funds belonging to B in the banking account, create a mirror value entry for B's identity on the blockchain that signifies B has money to trade
3. Invoke transfer_request(B→A) on the blockchain—banking account of B will be debited and money is moved to a temporary location in the core banking system.
4. Atomic DVP transaction takes place on the blockchain including the following steps:
    4.1 Asset1.transfer (A→B)
    4.2 transfer_request_commit(B→A); this triggers the transfer of the payment amount from B to A in the temporary location in the core banking system
    4.3 Commit DvP.
5. release_fund(A); this will make fund available in A's banking account.

The following table summarizes the system state at different stages:

| Original State | Intermediate State | Final State |
| --- | --- | --- |
| Asset1 (owner = A) | Asset1 (owner = A) | Asset1 (owner = B) |
| Money | Money | Money |
| (in B's account) | (suspense account) payment processor (statement owner = B) | (in A's account) |

Embodiments may provide the following features:

Functionality to verify the transfer request smart contract on the chain which can induce a transfer proposal of funds with the corresponding details like bank accounts, currency and amount involved.

The soft lock of the funds in a temporary receiver account pending for further transfer or DvP.

Functionality to verify again on the chain to see if the on-chain asset is transferred to the target or a particular payment-related smart contract is updated so the system can decide whether to unlock the locked funds for the receiver account or return the funds to the original owner.

The ability to customize the verification of whether the transfer of the digital asset counts as successful or not, and the ability to define the surrender trigger determining when funds should be returned (as per the preceding point)

Functionality to return any soft locked fund to the sender's account if anyone rejected the transaction to preserve atomicity.

Functionality to complete the DvP process without a centralized custodian for the cash and digital asset.

Functionality to support DvP on various types of blockchain platforms with the same process.

Embodiments may provide some or more of the following advantages:

Real time delivery can be enabled without any custodians built on atomic DvP using blockchain technology. Furthermore, transaction times can be reduced.

Credit risk of all parties can be reduced due to the removal of custodians. For the cash leg, the cash is always kept in the bank where the sender keeps the money; for the digital asset part, the asset is always owned by the receiver before the DvP transaction.

Individual flexible surrender strategies can be introduced according to the counter party's credit rating as well as the blockchain platform's behaviour.

The described pseudo-DvP approach can support a new atomic DvP model backed up by the credit from the payment processor. The on-chain digital asset can be traded atomically with real world money.

Mirror Value Transactions

Figure 16A:
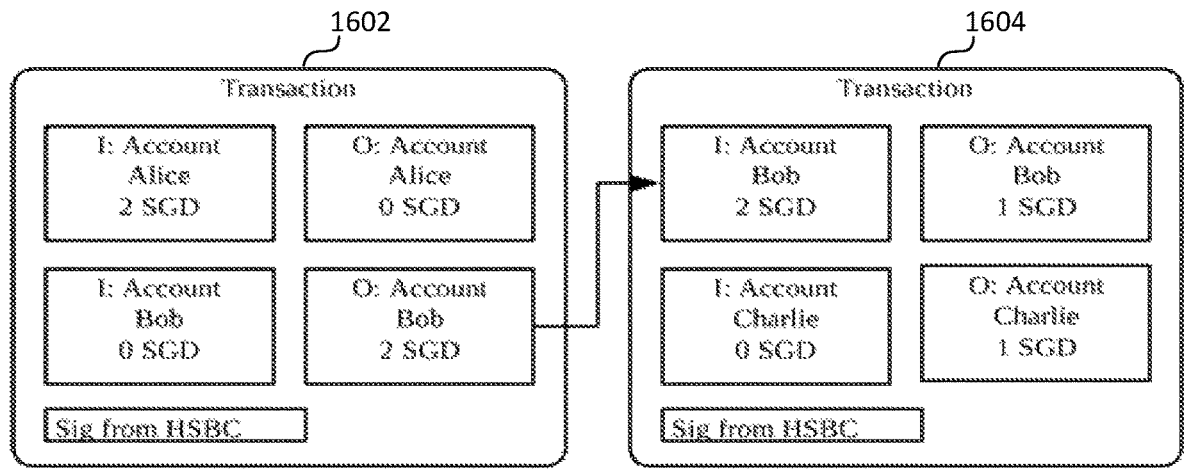
FIGS. 16A-16D illustrate different approaches for representing transaction value for mirror transactions.
Figure 16B:
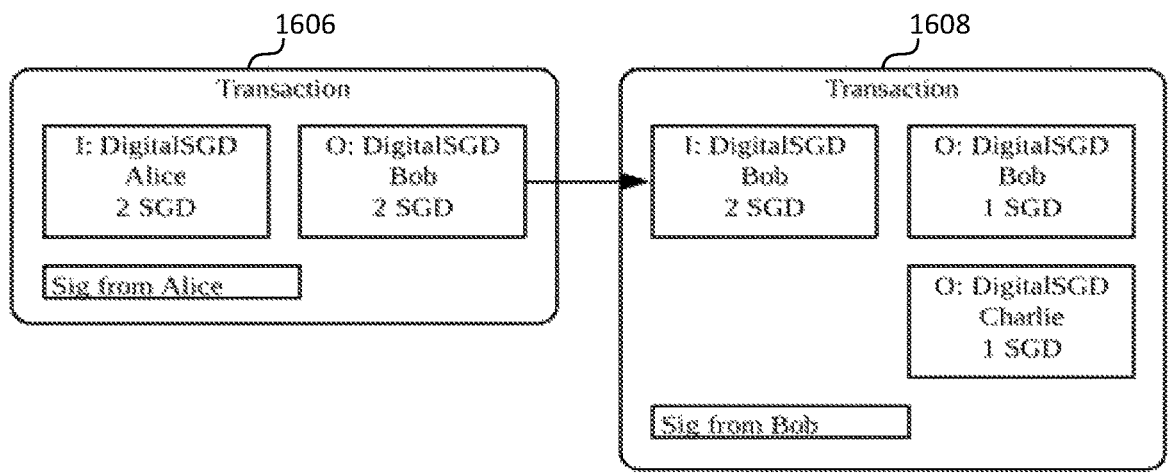
Figure 16C:
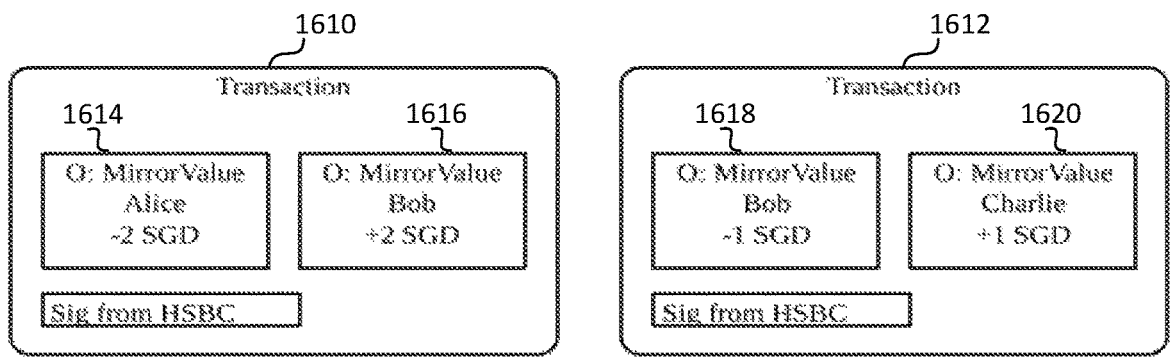

The mirror value transactions (implemented via the load, update and unload operations) are described above as using a simple account-based model (e.g. as used in the Ethereum blockchain). Such models can be contrasted with token-based models (e.g. as used by Bitcoin). FIGS. 16A-16C illustrate different value representations that could be used to implement mirror value transactions.

An account-based system records the state of the system as a list of accounts, each of which has a corresponding balance. When funds are transferred, the record is updated by increasing and decreasing the balances in the relevant accounts. In order to initiate a transfer, the holder of an account is required to demonstrate their authority to do so, either by proving their identity as the account holder, or proving that they hold some information (e.g. password or private key) that only the account holder should know. FIG. 16A illustrates account-based transactions, depicting an example of a first transaction 1602 transferring 2 SGD from user "Alice" to user "Bob" ("I" indicates the input state i.e. the state before the transaction and "O" indicates the output state i.e. the state after the transaction). A second transaction 1604 subsequently transfers 1 SGD from user "Bob" to user "Charlie". The transactions are digitally signed by the system/institution performing the transaction (in this case "HSBC").

A token-based system records the state of the system as a list of individual assets (or 'tokens'), each of which has a corresponding 'owner' who can control the asset (an example of this is the UTXO, Unspent Transaction Output, model employed by blockchain). Each of these tokens has a specific value (e.g. £15), which does not change. In order to initiate a transfer, the holder of a token is required to prove they control the token, usually by signing a payment instruction with the private key associated with that token. Individual tokens cannot be partially spent—instead, the token being transferred is generally 'destroyed' and replaced with two newly created smaller tokens (with the same total value), with one going to the recipient and the other being returned to the sender as 'change'. An example of token-based transactions corresponding to the transactions of FIG. 16A is shown in FIG. 16B, with first transaction 1606 transferring a 2 SGD token from user "Alice" to user "Bob" and second transaction 1608 replacing Bob's 2 SGD token with a 1 SGD token assigned to "Bob" and another 1 SGD token assigned to "Charlie". The transactions are signed by the users initiating the transfers.

A technical limitation of both methods is that payments with the same account cannot proceed concurrently, since every transaction requires the previous balance or token output as the transaction input. As a result, the blockchain transactions need to be queued, ordered, and be executed one by one. Because of the consensus algorithm required and the communication overhead in general blockchain, the throughput is limited by this dependency.

Preferred embodiments address this by implementing a data model employing a hybrid of token-based and account-based representation. The approach is depicted in FIG. 16C and involves creating individual transaction tokens associated with particular user identities or accounts. Each transaction token specifies either a negative transaction value (for a debit) or a positive transaction value (for a credit). A smart contract on the blockchain implements a mirror value movement operation by creating the relevant transaction tokens. For example, such a smart contract could be defined as an operation Move(Source, Destination, Amount)

Depicted transaction 1610 (as before) involves a payment of 2SGD from user "Alice" to user "Bob"—that is, an operation:

Move(Source="Alice", Destination="Bob", Amount=2 SGD)

The Move operation creates two transaction tokens which are stored on the blockchain and which include a reference to the relevant account: token 1614 represents the deduction of 2 SGD from account "Alice" and token 1616 represents the addition of 2 SGD to account "Bob". Similarly, subsequent transaction 1612 involves (as before) transfer of 1SGD from "Bob" to "Charlie", i.e. an operation:

Move(Source="Bob", Destination="Charlie", Amount=1 SGD)

This results in transaction tokens 1618 and 1620 defining the corresponding debit and credit operations.

Figure 16D:
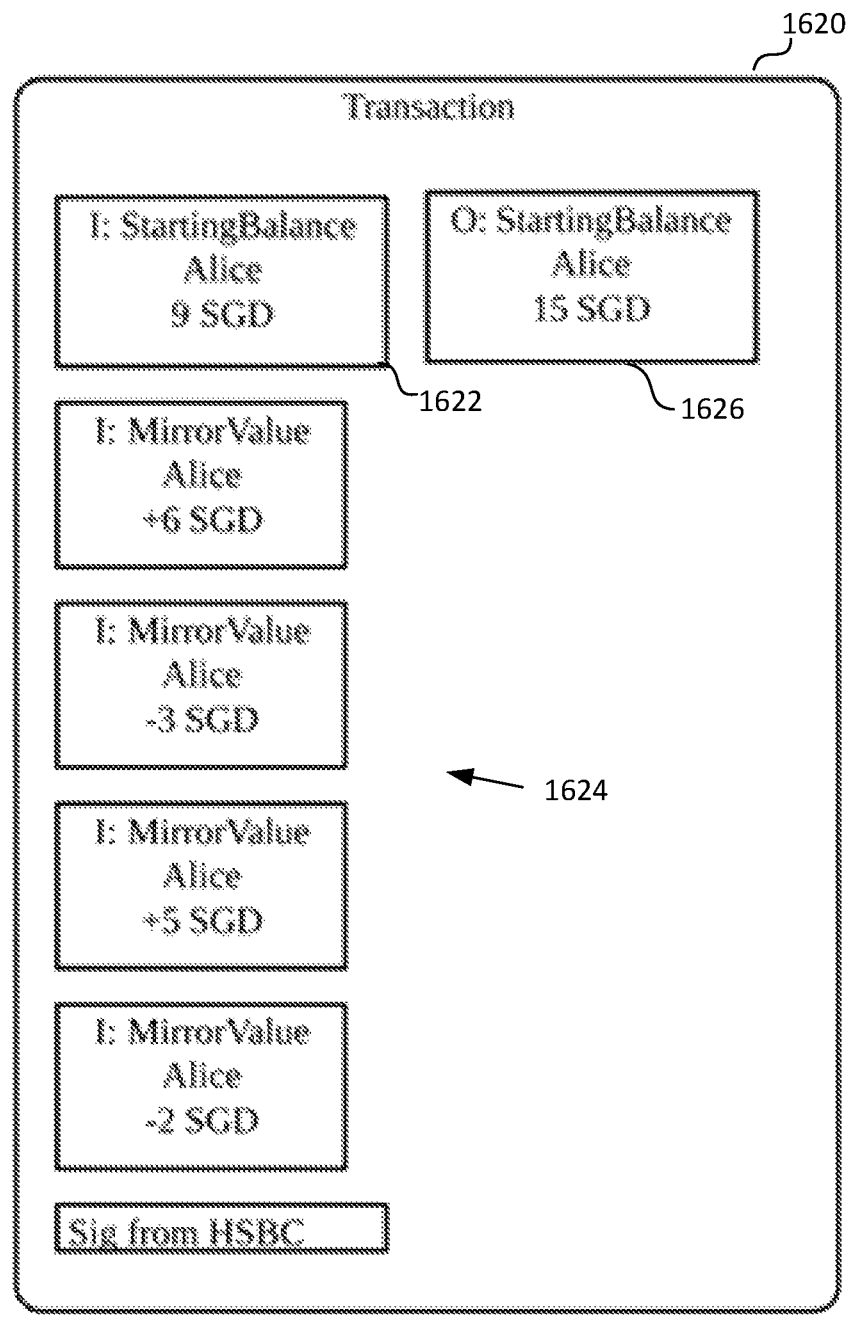

At desired time intervals—e.g. at the end of each day—a consolidation process is performed to sum mirror value transaction tokens. This effectively merges all the transactions on-chain during the day. The result provides a starting balance for the next period, e.g. the next day, which is associated with the user account. The summation also incorporates any starting balance from the previous day. FIG. 16D illustrates a consolidation transaction for a particular account, in which the previous starting balance 1622 for account "Alice" is summed with the transactions 1624 for the transaction period (e.g. the previous day) to produce new starting balance 1626 for that account.

Preferred embodiments use the hybrid representation of FIG. 16C to implement the mirror transactions using the Load/Update/Unload operations as previously described, e.g. with reference to FIGS. 12-14. Typically in that case, the starting balance for each day may be zero (since a load operation to a sender account will be balanced by update operations to move mirror value to a receiver account, and then an unload operation to return the value to the global mirror account). However, this may not be the case if there are incomplete, e.g. long-running transactions. Furthermore, as noted above, other approaches may be adopted, e.g. a single periodic load and unload per user to support multiple transactions. Furthermore, load/unload operations may occur at different times and/or frequencies in relation to the balance consolidation period.

Thus, in this approach, the mirror transaction data comprises a set of virtual account identities (e.g. sender identity, receiver identity, global mirror value account identity, and any intermediary identities). Positive and negative mirror value tokens (associated with particular account identities) are created to effect movement of mirror value by the load, update and unload operations. A starting balance token is also associated with each account identity. The consolidation operation (which may itself be implemented as one or more smart contracts on the blockchain) then periodically (e.g. daily) computes a new starting balance for each account identity for the next transaction period and associates it with the account identity. Existing starting balance and transaction tokens are destroyed (e.g. deleted or invalidated) by the consolidation. The subsequent transaction period then proceeds based on the new starting balance tokens. Note that during a transaction period, balances may be computed for account identities using the same process (summing starting balance and transaction tokens). A query operation may be provided (e.g. as a smart contract) to do so.

The described hybrid approach allows the system to perform parallel submission of transactions and leverage the core banking system's high throughput. No output from a previous transaction is needed as the input to the next transaction (as is the case in the account-based or token-based models). Since there is no need to queue transactions, system throughput and performance can be boosted.

The described approach also provides improved security and privacy. In the account-based model as depicted in FIG. 16A, a single transaction includes the account balances of sender and receiver because the sender and receiver are in the same transaction. With the hybrid transaction-token based approach of FIG. 16C, the transaction recorded on the blockchain only identifies the payment amount, without revealing account balances. The real account balances are maintained in the core banking system. This approach thus segregates the on-chain mirror transaction and the off-chain settlement, reducing potential exposure of user information.

Hybrid Token Representation—Example Implementation

The following section sets out details of an example implementation of the hybrid transaction token representation used to represent the mirror value quantities on the blockchain.

Mirror value tokens may be implemented using the following data structure, defining a mirror value (MV) token, also referred to as an MV ticket:

owner: the owner of this mirror value ticket
issuer: the issuer of this mirror value ticket, usually meaning the settlement bank/payment processor
instructedMVUnit: the amount of money being transferred
instructedMVCurrency: the currency of the transferred money (e.g. USD, SGD, HKD)
transactionType: a debit or credit
transactionTime: the time where the transaction happens
transactionId: the unique transactionId of the blockchain transaction
requestRef: an end to end ID to reference the transaction in the blockchain network and also the core banking system
settlementBankRef: the reference code generated by the core banking system In the proposed model, transaction records are stored as mirror value (MV) tickets within a 24 hour interval and (as consolidated start-of-day balances) at the start of every day. Each MV ticket is associated with a particular user/account ("owner"). A scheduled task is run to accumulate all MV tickets of the previous day for each user/account and then create a single MV ticket for each user/account with the latest total amount at the time of calculation, the start-of-day (SOD) balance. All previous MV tickets are destroyed by this process.

The MV balance calculation may be implemented as follows (for a given user/account identity):

$$SOD\_balance(today) = SOD\_balance(yesterday) + \sum_{i=0}^{n} f(i) =$$
$$SOD\_balance(yesterday) + f(0) + f(1) + \ldots + f(n)$$

In the above formula, $f(i)$ represents the function to query the amount to be transferred within an MV ticket, i represents the index of the MV ticket that is being queried for the previous day and n represent the number of transactions performed during the previous day.

StartOfDayBalance data structure:
owner: the owner of this start of day balance
issuer: the issuer of this start of day balance (sum of all mirror value tickets within a day), usually meaning the settlement bank
instructedMVUnit: the total amount of money being transferred
instructedMVCurrency: the grouped currency of all mirror values (e.g. USD, SGD, HKD)
asOf: the time where this operation has finished
timeZone: the timezone where the server is located During the day, if the client (e.g. a particular user) wishes to know how much MV they have, this can be computed as:

$$CurrentBalance = SOD\_balance(today) + \sum_{i=0}^{m} f(i) =$$
$$SOD\_balance(today) + f(0) + f(1) + \ldots + f(m)$$

In the above formula, $f(i)$ represents the function to query the amount to be transferred within an MV ticket, i represents the index of an MV ticket that was created during the current day and m represent the number of transactions so far that day (for that user identity).

In embodiments of the system, an MV ticket is not necessarily the final output state of a money transfer. For example, a positive MV ticket (e.g. receipt of a payment for a first transaction) and a negative MV ticket (e.g. making a payment for a second transaction) can be created simultaneously. In the preferred embodiments, multiple MV tickets can be created concurrently within the same account because the system supports parallelism in creating new transactions. This is because the system relies on the core banking system, (a high throughput and low latency validation system), as the main or single source of trust. Mirror values just provide a reflection of the money movement between real money accounts.

For example:
At T0, Alice has completed the load operation and the transfer operation is in progress At T1, Alice has completed the transfer operation and meanwhile she triggers a new load request which completes immediately Here, the load operation at T1 does not need to wait until the previous transfer operation is completed. The core banking system is responsible for verifying that Alice has a sufficient balance in her bank account and validates that no double spending has occurred.

As a result, multiple transactions for a given sender (or receiver) can be submitted without waiting for earlier transactions to complete. Furthermore, transactions for the same sender (or receiver) can be submitted concurrently from different sources (e.g. from different transaction processing nodes).

The described solution can thus support parallelism in a more advanced way. Unlike traditional blockchain system, where new transactions must be ordered prior to execution or executed followed by conflict resolution, the proposed system allows transactions to be processed in parallel without worrying about conflicting transactions, because the core banking system is the source of trust, while MV provides a reflection on the blockchain of money movement in the core banking system. The system can therefore support parallel cash settlement processing because the traditional core banking system is generally able to handle concurrent payment requests in a fast, secure and reliable manner.

Furthermore, in traditional token-based models (e.g. the UTXO model), particularly when a user accumulates many tokens on the blockchain, the query of historical transactions and calculation of the total values can take a long time. In the present system, the SOD balance is refreshed periodically (preferably during non-peak hours, e.g. daily) reducing the number of tickets for a given user to a single ticket. As a result, the response time (though not always as low as a pure account-based model which may only require a single query for every transaction), will be close to that of the account-based model and in some circumstances equal to the account based model (when there have been no transactions since balance consolidation).

Blockchain Storage of MV Entries

As discussed above, mirror value tickets (e.g. positive and negative transaction tokens, and consolidated start-of-day balances) are recorded on the blockchain. Each entry is associated with an "owner" entity i.e. a user/account identity on the blockchain (e.g. corresponding to a sender or receiver of a payment, or a bank or other financial institution, transaction intermediary etc.) The mirror value data—e.g. the MV tickets—is added to blocks which are submitted for storage to the blockchain using the standard block submission process of the blockchain, including the relevant consensus mechanism. Multiple MV tickets may be accumulated to form a block (e.g. up to a defined block data size). Upon completion of the consensus algorithm each new block is added to the blockchain.

If the blockchain employs proof-of-work as the consensus mechanism, then addition of mirror value entries may be relatively slow. Nevertheless, as described, the hybrid mirror value representation used means that a given transaction does not have to wait for previous mirror value updates to complete. New MV tickets can be created and submitted for storage on the blockchain for a user/account, before previous tickets for the same user/account have been fully processed and stored to the blockchain (e.g. before a block including those tickets has been processed by the consensus mechanism).

Nevertheless, if mirror value updates are slow then completion of each individual DvP transaction may be delayed, which may reduce overall transaction throughput. Embodiments of the invention may adopt a number of strategies for addressing this.

Firstly, as depicted in FIG. 4, bridge nodes may maintain a local mirror value database 412, storing local copies of all mirror value entries (tokens/tickets) written to the blockchain. This makes mirror value data available while it is still being written to the blockchain.

Secondly, mirror value updates may be written to the blockchain in batches. This feature may be implemented in conjunction with the local mirror value database of FIG. 4. For example, mirror value updates (e.g. creation of new mirror value tokens) may be recorded immediately in the database 412, but writing to the blockchain may be deferred. Mirror value updates are collected until a predetermined criterion for batch processing is met. When the batch update is performed, the mirror value updates collected at that point are then written to the blockchain in a single operation, e.g. as a single block or a number of blocks of the blockchain. The batch criterion could be collection of a predetermined number of updates or collection of a predetermined data volume (e.g. corresponding to a required or maximum block size for the blockchain or a multiple thereof). Alternatively, updates may be written periodically, with all updates collected during a period being written to the blockchain at the end of the period. Criteria could also be combined, e.g. with a batch update performed when a particular number of entries have been accumulated, but in any case at the end of the collection period. The system may also ensure that all collected entries are written to the blockchain before computing start of day balances.

Thirdly, a different consensus mechanism may be used (e.g. proof-of-stake or proof-of-authority) to improve throughput, or the system could not employ any consensus mechanism (e.g. with the bridge nodes able to add blocks to the blockchain without external verification). In some cases, there may be a requirement for the digital asset transaction to use a strong consensus mechanism, such as proof-of-work. In that case, the system could use a blockchain architecture that supports different consensus mechanisms for different transaction types or block types, for example using proof-of-work for the digital asset transaction and proof-of-authority (or no consensus) for the mirror value entries.

Note that relying on a weaker (or no) consensus mechanism or using a local mirror value database do not necessarily significantly reduce the overall security and transaction integrity of the system, because the purpose of the mirror value entries is to serve as a reflection of the real-money transaction and as such the mirror value transaction is synchronized to the real-money transaction as previously described. Furthermore, the core banking system controls the real-money transaction and serves as the source of trust, ensuring that the transaction is valid and completes successfully (e.g. ensuring that funds to support a transaction are available etc.)

Several, or all, of the above techniques (local MV database, batch processing of MV updates and appropriate consensus mechanism selection) may also be combined.

Computer System

Figure 17:
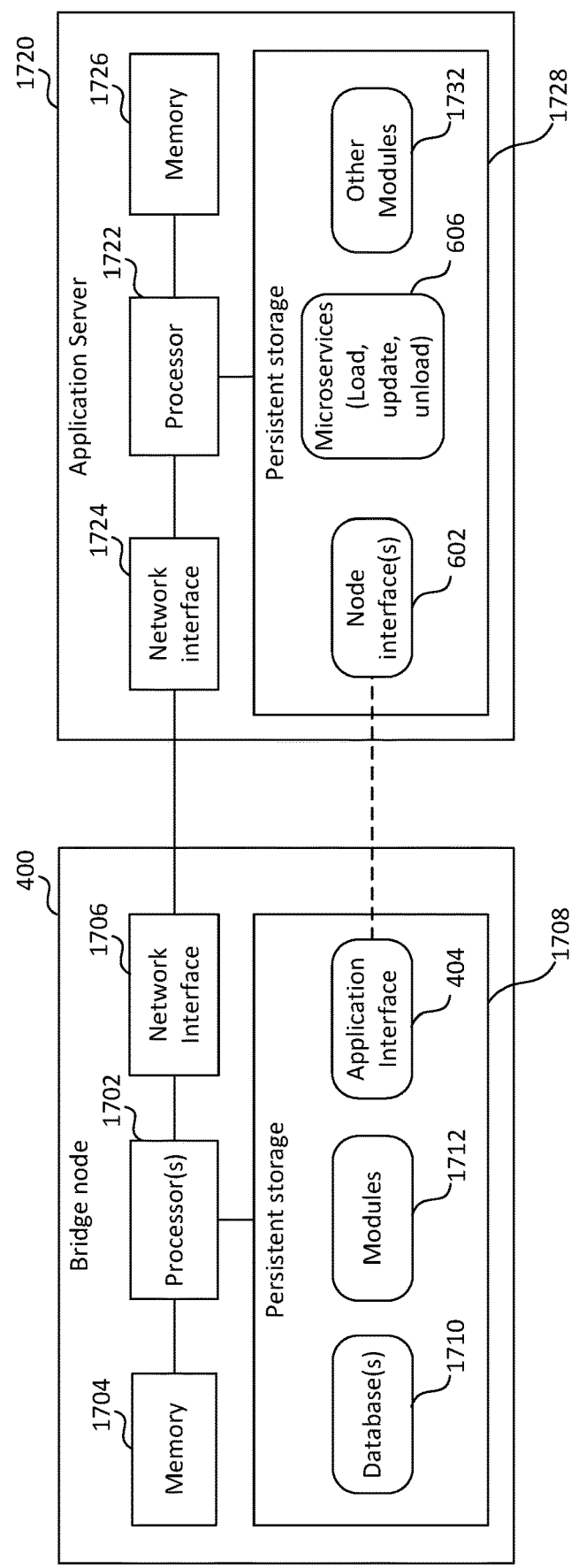
FIG. 17 illustrates hardware/software components of a bridge node and application node suitable for implementing described techniques.

FIG. 17 illustrates hardware devices used to implement a bridge node 400 and an application server 1720 for providing the bank application 516 (and possibly other functions of the core banking system 110).

The bridge node includes one or more processors 1702 together with volatile/random access memory 1704 for storing temporary data and software code being executed.

A network interface 1706 is provided for communication with other system components (e.g. application server 1720 and other blockchain nodes) over one or more networks (e.g. Local or Wide Area Networks, including the Internet). In preferred embodiments the bridge node and application server are located within a private network of the organisation (e.g. bank) providing the service. Blockchain data may be received from and sent to other blockchain nodes via the network interface (e.g. when adding a block to the blockchain).

Persistent storage 1708 (e.g. in the form of hard disk storage, optical storage and the like) persistently stores data and software for implementing the node functions, including databases 1710 (e.g. corresponding to databases 412-420 of FIG. 4), various software modules 1712 (e.g. corresponding to modules 402, 406, 408, 410 of FIG. 4), including the smart contracts such as the load, update and unload smart contracts, and application interface 404 for communicating with the application server. The persistent memory may include a local copy of some or all of the blocks of the blockchain (which may include, e.g. digital asset records, mirror transaction data, the various smart contracts etc.). If the node does not store a complete copy of the blockchain it may interact with other blockchain nodes to retrieve blocks as needed. The persistent storage also includes other server software and data (not shown), such as a server operating system.

The server will include other conventional hardware and software components as known to those skilled in the art, and the components are interconnected by data buses (e.g. a memory bus and I/O bus).

The application server 1720 again includes one or more processors 1722 together with volatile/random access memory 1726 for storing temporary data and software code being executed.

A network interface 1724 is provided for communication with other system components (including one or more bridge nodes 400 and other core banking system/back office components) over one or more networks.

Persistent storage 1728 (e.g. in the form of hard disk storage, optical storage and the like) persistently stores data and software for implementing the bank application functions, including node interface(s) 602 for communicating with bridge node(s) 400, the microservices 606 for implementing the load, update and unload operations, and other software modules 1732 (e.g. corresponding to modules 604, 614, 616 of FIG. 6). The application server could also include various databases and/or other functions, for example some or all of the back office system functions depicted in FIG. 7.

The persistent storage also includes other server software and data (not shown), such as a server operating system, and the server will include other conventional hardware and software components as known to those skilled in the art.

While a specific architecture is shown by way of example, any appropriate hardware/software architecture may be employed. Other components (e.g. buyer/seller devices, intermediary servers, back office systems etc.) may be implemented using similar conventional computer/server designs.

Furthermore, functional components indicated as separate may be combined and vice versa. For example, the functions of the bridge node 400 and application server 1720 could be combined in a single computing device. Functions of a bridge node or application server could also be distributed over multiple devices (e.g. a server cluster implementing the application server functions). As a further example, databases may be integrated into processing components or stored at separate database servers.

A blockchain as used herein may include a set of cryptographically linked data blocks, stored in a distributed storage medium/platform. The blockchain platform employed may, e.g., be Ethereum, but any suitable blockchain technology platform may be used. References to blockchains, blockchain technology, blockchain platforms and the like throughout this document are not intended to be limited to any particular implementations of such technology but shall generally be taken to encompass any appropriate type of distributed ledger technology (DLT) and/or any storage technology based on cryptographically linked blocks. The terms blockchain and distributed ledger/DLT may thus be used interchangeably.

It will be understood that the present invention has been described above purely by way of example, and modification of detail can be made within the scope of the invention.

The invention claimed is:

1. A system for performing a coordinated transaction, the coordinated transaction including a digital asset transaction performed on a blockchain and a payment transaction performed at a payment processing system, the system comprising:
a blockchain subsystem in communication with the blockchain via a first interface, and in communication with the payment processing system via a second interface;
the blockchain subsystem comprising a memory and a processor, the memory storing a main workflow smart contract, a load smart contract, an update smart contract, and an unload smart contract;
the main workflow smart contract, when executed by the processor, causes the processor to perform operations of:
receiving a payment instruction for the payment transaction;
executing the load smart contract, wherein executing the load smart contract comprises carrying out a load operation by:
transferring, via communication with the payment processing system using the second interface, payment funds from a sender account to an intermediate account entity associated with the payment sender as part of the payment transaction, and
recording, via communication with the blockchain using the first interface, mirror transaction data allocating a mirror value of a digital asset corresponding to a value of the payment funds from a global mirror identity to a sender identity in the mirror transaction data for use in the digital asset transaction;
following execution of the load smart contract, executing the update smart contract, wherein executing the update smart contract comprises carrying out an update operation by:
moving, via communication with the payment processing system using the second interface, the payment funds from the intermediate account entity associated with the payment sender to an intermediate account entity associated with the payment receiver as part of the payment transaction, and
updating, via communication with the payment processing system using the second interface, the mirror transaction data to track movement of the payment funds by transferring the mirror value of the digital asset from the sender identity to the receiver identity in the mirror transaction data as part of the digital asset transaction;

following execution of the update smart contract, executing the unload smart contract, wherein executing the unload smart contract comprises carrying out an unload operation by:

transferring, via communication with the payment processing system using the second interface, the payment funds from the intermediate account entity associated with the payment receiver to an account of the payment receiver as part of the payment transaction, and updating, via communication with the blockchain using the first interface, the mirror transaction data by deallocating the mirror value of the digital asset from the receiver identity and allocating it to the global mirror identity as part of the digital asset transaction.

2. The system according to claim 1, wherein the system is configured to perform at least one of:

performing the digital asset transaction and a given one of the load, update, and unload operations as an atomic operation; and rolling back the payment transaction based on the mirror transaction data in response to failure of a part of the coordinated transaction.

3. The system according to claim 1, wherein the intermediate account entity comprises a first holding account for receiving an incoming payment and a second holding account for sending an outgoing payment, wherein transferring payment funds from the sender account to the intermediate account entity associated with the payment sender comprises transferring the payment funds to the first holding account, moving the payment funds from the intermediate account entity associated with the payment sender to an intermediate account entity associated with the payment receiver as part of the update operation comprises transferring of the payment funds from the first holding account to the second holding account; wherein the first and second holding accounts are preferably associated with the payment sender and payment receiver respectively and/or or are logical subaccounts of a holding account maintained by a payment processing provider.

4. The system according to claim 1, wherein executing the main workflow smart contract further causes the processor to perform the digital asset transfer and the update operation as an atomic operation, whereby: the digital asset transfer and update operation are rolled back in response to failure of either the digital asset transfer or the update operation, and/or the unload operation is performed only in response to successful completion of the digital asset transfer and the update operation.

5. The system according to claim 1, wherein recording mirror transaction data allocating the mirror value, transferring the mirror value, and deallocating the mirror value comprises deducting the mirror value from a first identity and adding the mirror value to a second identity, by associating a negative mirror value update record with the first identity and associating a positive mirror value update record with the second identity; wherein the main workflow smart contract, when executed by the process, further causes the processor to perform a consolidation operation periodically, wherein the consolidation operation comprises computing for a given identity in the mirror transaction data, a starting balance for a second transaction period based on a current starting balance entry associated with the given identity for a first, preceding, transaction period and a set of mirror value update records associated with the given identity created during the first transaction period, and deleting or invalidating the starting balance entry and/or mirror value update records associated with the first transaction period.

6. The system according to claim 1, wherein one or more or each of the load operation, update operation, unload operation, and the consolidation operation comprise code routines, stored and/or configured to execute on the blockchain.

7. The system according to claim 1, the memory further comprising further operations in the form of code routines, adapted to run on the blockchain, to perform the recording and updating of the mirror transaction data, the further operations preferably invoked by the load, update, and/or unload operations.

8. The system according to claim 1, wherein each of the load, update, and unload operations are associated with and configured to invoke a respective operation at the payment processing system, the operations at the payment processing system for performing respective stages of the payment transaction, wherein the operations at the payment processing system are preferably implemented as a set of services running at the payment processing system that are invoked via an application programming interface (API) of the payment processing system.

9. The system according to claim 1, wherein the blockchain subsystem, the first and second interfaces and load, update, and unload operations are implemented on one or more processing nodes operating as one or more nodes of the blockchain, the processing node(s) preferably connected to the payment processing system via a network.

10. A method of synchronizing a blockchain transaction with a payment transaction at a payment processing system, using a blockchain subsystem in communication with a blockchain via a first interface and in communication with the payment processing system using a second interface, wherein the payment transaction is for transfer of a payment amount from a payment sender to a payment receiver, the method comprising:

executing, by a blockchain subsystem, a main workflow smart contract, wherein executing the main workflow smart contract comprises:

receiving a payment instruction for the payment transaction;

executing a load smart contract, wherein executing a load smart contract comprises carrying out a load operation by:

transferring, via communication with the payment processing system using the second interface, payment funds from a sender account to an intermediate account entity associated with the payment sender as part of the payment transaction, and recording, via communication with the blockchain using the first interface, mirror transaction data allocating a mirror value of a digital asset corresponding to a value of the payment funds from a global mirror identity to a sender identity in the mirror transaction data for use in the digital asset transaction;

following execution of the load smart contract, executing an update smart contract, wherein executing the update smart contract comprises carrying out an update operation by:

moving, via communication with the payment processing system using the second interface, the payment funds from the intermediate account entity associated with the payment sender to an intermediate account entity associated with the payment receiver as part of the payment transaction, and updating, via communication with the payment processing system using the second interface, the mirror transaction data to track movement of the payment funds by transferring the mirror value of the digital asset from the sender identity to the receiver identity in the mirror transaction data as part of the digital asset transaction;

following execution of the update smart contract, executing an unload smart contract, wherein executing the unload smart contract comprises carrying out an unload operation by:

transferring, via communication with the payment processing system using the second interface, the payment funds from the intermediate account entity associated with the payment receiver to an account of the payment receiver as part of the payment transaction, and updating, via communication with the blockchain using the first interface, the mirror transaction data by deallocating the mirror value of the digital asset from the receiver identity and allocating it to the global mirror identity as part of the digital asset transaction.

11. The method according to claim 10, further comprising performing the blockchain transaction and update operation as an atomic operation, such that the load, update, and unload operations are rolled back in response to failure of either one of the blockchain transaction and the update operation and/or such that the unload operation is performed in dependence on successful execution of both the blockchain transaction and the update operation.

12. The method according claim 10, wherein the blockchain transaction comprises a transaction for exchange of a digital asset, the transaction comprising transfer of the digital asset from the payment receiver to the payment sender, wherein transfer of ownership of the digital asset is preferably recorded on the blockchain.

13. The method according to claim 10, wherein transferring a mirror value from a given first identity to a given second identity comprises creating a debit value token and a credit value token corresponding to the mirror value, and associating the debit value token with the given first identity and the credit value token with the given second identity; the method further comprising, for each of a plurality of entities, comprising the one or more of the sender identity, receiver identity, and a global mirror value account identity, maintaining on the blockchain:

a starting balance associated with the entity;
one or more debit tokens each indicating a mirror value deduction from the entity;
one or more credit tokens indicating a mirror value addition to the entity, the method preferably further comprising:
accumulating debit and/or credit tokens associated with one or more entities during a transaction period;
at the end of the transaction period, computing a new starting balance based on the starting balance associated with the entity and the accumulated debit and/or credit tokens associated with the entity; and
associating the new starting balance with the entity for use in a subsequent transaction period.

14. The method according to claim 10, comprising verifying data on the blockchain by determining whether a sum of mirror values associated with the sender identity, receiver identity, and global account identity at the end of a payment transaction correspond to the corresponding sum prior to the transaction or whether the sum equals zero at the end of the transaction, and aborting and/or rolling back the blockchain transaction, mirror value transaction and/or payment transaction in the event of a negative determination.

* * * * *